United States Patent
Yamamoto et al.

(10) Patent No.: US 9,235,536 B2
(45) Date of Patent: Jan. 12, 2016

(54) INFORMATION REGISTRATION APPARATUS, INFORMATION REGISTRATION METHOD, INFORMATION REGISTRATION PROGRAM, AND RECORDING MEDIUM

(75) Inventors: Aisa Yamamoto, Shinagawa-ku (JP); Nobuyuki Mugima, Shinagawa-ku (JP)

(73) Assignee: Rakiten, Inc., Tokyo (JP)

( * ) Notice: Subject to any disclaimer, the term of this patent is extended or adjusted under 35 U.S.C. 154(b) by 176 days.

(21) Appl. No.: 13/810,859

(22) PCT Filed: Dec. 8, 2011

(86) PCT No.: PCT/JP2011/078462
§ 371 (c)(1),
(2), (4) Date: Jan. 17, 2013

(87) PCT Pub. No.: WO2012/111223
PCT Pub. Date: Aug. 23, 2012

(65) Prior Publication Data
US 2013/0124662 A1 May 16, 2013

(30) Foreign Application Priority Data
Feb. 17, 2011 (JP) ................. 2011-032199

(51) Int. Cl.
*H04L 12/58* (2006.01)
*G06F 13/00* (2006.01)
(Continued)

(52) U.S. Cl.
CPC ............. *G06F 13/00* (2013.01); *H04L 51/08* (2013.01); *H04L 51/28* (2013.01); *H04L 51/32* (2013.01); *H04L 63/102* (2013.01); *H04L 67/02* (2013.01)

(58) Field of Classification Search
CPC ....... G06F 13/00; H04L 63/012; H04L 67/02; H04L 51/28; H04L 51/32; H04L 51/08
USPC .................. 709/204–206, 220–222, 227–229
See application file for complete search history.

(56) References Cited

U.S. PATENT DOCUMENTS 9,037,663 B2 * 5/2015 Watanabe et al. ............. 709/206
2006/0235984 A1 10/2006 Kraus et al.

FOREIGN PATENT DOCUMENTS

JP 2000-231526 A 8/2000
JP 2002-149576 * 5/2002 ............. G06F 13/00
(Continued)

OTHER PUBLICATIONS

Japanese Office Action issued Jun. 21, 2011 corresponding to Japanese Patent Application No. 2011-032199.
(Continued)

*Primary Examiner* — Kenneth R Coulter
(74) *Attorney, Agent, or Firm* — Sughrue Mion, PLLC

(57) ABSTRACT

While making it possible to register generation information used to generate a Web page for each topic by sending element information being components of the Web page by an email and add element information to the generation information by an email, it is made difficult for persons other than a person who registered the generation information to add the element information. When a receiver address included in a received email is a first address, an information registration apparatus registers generation information included in the email and transmits an email including a unique second address corresponding to the generation information to a sender of the received email, and when the receiver address is a second address and the receiver address is not the same as receiver addresses included in emails received before, the information registration apparatus adds element information to the generation information corresponding to the receiver address included in the currently received email.

19 Claims, 14 Drawing Sheets

(51) Int. Cl.
*H04L 29/06* (2006.01)
*H04L 29/08* (2006.01)

(56) References Cited

FOREIGN PATENT DOCUMENTS

| JP | 2002-149576 | A | | 5/2002 | |
| JP | 2004-046617 | | * | 2/2004 | .............. G06F 13/00 |
| JP | 2004-046617 | A | | 2/2004 | |
| JP | 2006-024058 | A | | 1/2006 | |
| JP | 2007-219763 | A | | 8/2007 | |
| JP | 2007-235595 | A | | 9/2007 | |
| JP | 2008-225703 | | * | 9/2008 | .............. G06F 13/00 |
| JP | 2008-225703 | A | | 9/2008 | |
| WO | 2010/061600 | A1 | | 3/2010 | |

OTHER PUBLICATIONS

Margaret Rouse, Disposable email, wliatis.com, Aug. 29, 2009.

* cited by examiner

FIG.3A
MEMBER INFORMATION DB

| |
|---|
| USER ID |
| PASSWORD |
| NICKNAME |
| NAME |
| DATE OF BIRTH |
| GENDER |
| ADDRESS |
| PHONE NUMBER |
| EMAIL ADDRESS OF MOBILE PHONE |
| EMAIL ADDRESS OF PC |
| . . . |

FIG.3B
RECIPE INFORMATION DB

| |
|---|
| RECIPE ID |
| POSTING PERSON USER ID |
| PUBLICATION FLAG |
| PUBLICATION DATE |
| RECIPE TITLE |
| DISH NAME |
| DISH IMAGE |
| INGREDIENT NAMES AND AMOUNTS OF INGREDIENTS |
| COMMENT |
| PROCESS INFORMATION |
| COOKING TIME |
| COST OF INGREDIENTS |
| USE |
| TRIGGER TEXT |
| . . . |

FIG.3C
PROCESS INFORMATION

| | |
|---|---|
| THE NUMBER OF PROCESSES | |
| PROCESS 1 | PROCESS TEXT |
| | PROCESS IMAGE |
| PROCESS 2 | PROCESS TEXT |
| | PROCESS IMAGE |
| . . . | |

FIG.3D
MANAGEMENT INFORMATION DB

| |
|---|
| MANAGEMENT ID |
| TYPE ID |
| ISSUE TARGET RECIPE ID |
| ISSUE TARGET USER ID |
| ONE-TIME MAIL BOX NAME |
| ISSUE DATE AND TIME |
| RECEPTION FLAG |

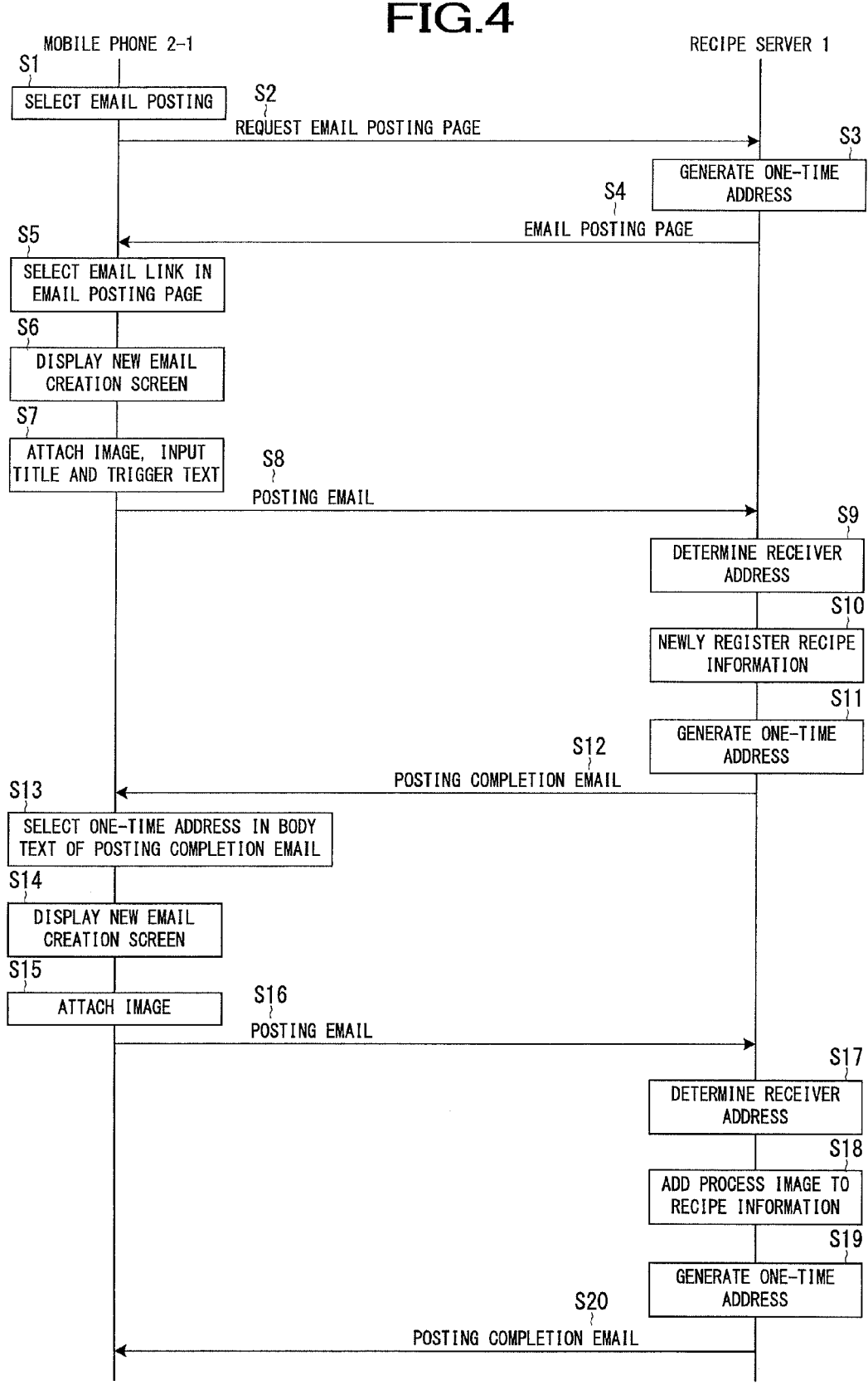

FIG.5A

RECIPE DRAFT POSTING

You can store recipe image, recipe title, and recipe comment in draft state from your mobile phone.
* Input other items from your pc to post recipe.

[SEND RECIPE IMAGE BY EMAIL] — 101

■ Attach a photo of completed dish (required)
* No more than 2 mb
* The second and the following photos will be ignored.

■ Write recipe title in the subject (optional)
* No more than 25 characters
* If there is no input, recipe title is automatically inputted.

FIG.5B

NEW EMAIL

| To | b5045f59d113@up.recipe.xxx.co.jp — 111 |
|---|---|
| Sub | Cream Spaghetti with full of Vegetables — 112 |
| Attached | 20110101123456.jpg — 113 |

There are too many eggplants and broccoli — 114
............

FIG.5D

NEW EMAIL

| To | f7b5c8581ec8@up.recipe.xxx.co.jp — 111 |
|---|---|
| Sub | — 112 |
| Attached | 20110101125623.jpg — 113 |

RECEIVED EMAIL

| Time | 2011/1/1 12:40 |
|---|---|
| From | noreplay@recipe.xxx.co.jp |
| Sub | Email posting is completed! |

Email posting is completed!

■ Post a process image of this recipe
f7b5c8581ec8@up.recipe.xxx.co.jp — 121

■ See a list of draft recipes
http://.recipe.xxx.co.jp/xxxxxxxxxxxxxxxx
xxxxxxxxxxx

FIG.5E

RECEIVED EMAIL

| Time | 2011/1/1 13:00 |
|---|---|
| From | noreplay@recipe.xxx.co.jp |
| Sub | Email posting is completed! |

Email posting is completed!

■ Post a process image of this recipe
j92afu9rtq0s@up.recipe.xxx.co.jp — 121

■ See a list of draft recipes
http://.recipe.xxx.co.jp/xxxxxxxxxxxxxxxx
xxxxxxxxxxx

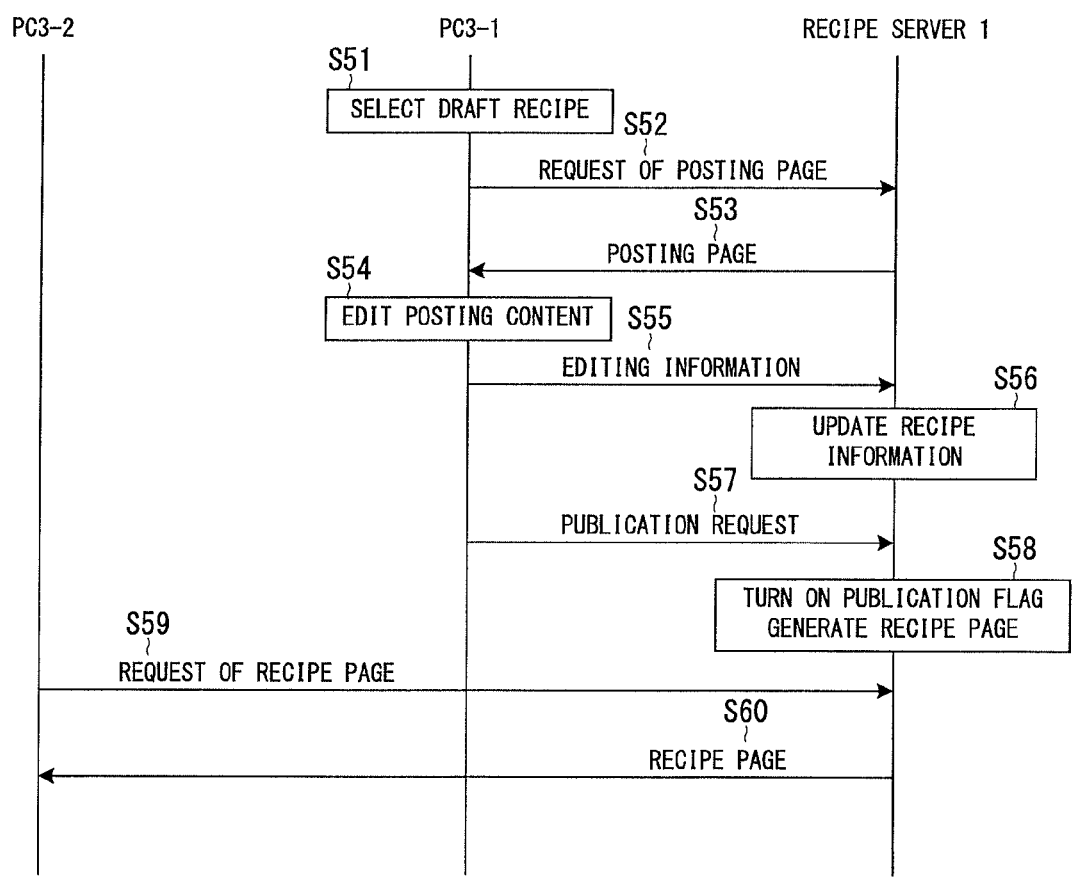

FIG.7

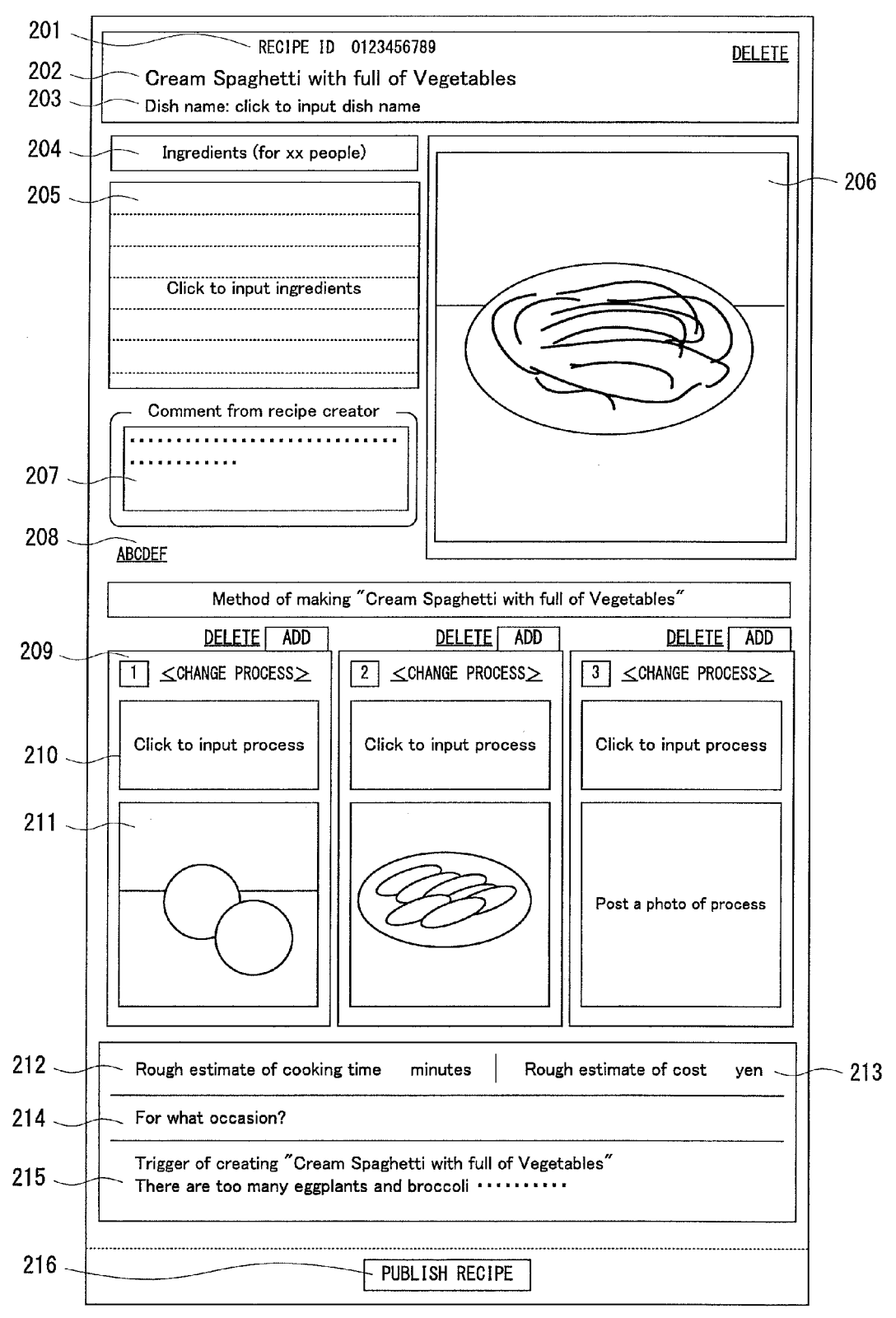

- 201 — RECIPE ID 0123456789 — DELETE
- 202 — Cream Spaghetti with full of Vegetables
- 203 — Dish name: click to input dish name
- 204 — Ingredients (for xx people)
- 205 — Click to input ingredients
- 206 — (image of dish)
- 207 — Comment from recipe creator
- 208 — ABCDEF Method of making "Cream Spaghetti with full of Vegetables"

- 209 — DELETE | ADD    DELETE | ADD    DELETE | ADD
  - [1] ≤CHANGE PROCESS≥    [2] ≤CHANGE PROCESS≥    [3] ≤CHANGE PROCESS≥
- 210 — Click to input process | Click to input process | Click to input process
- 211 — (images) | (images) | Post a photo of process

- 212 — Rough estimate of cooking time   minutes
- 213 — Rough estimate of cost   yen
- 214 — For what occasion?
- 215 — Trigger of creating "Cream Spaghetti with full of Vegetables" There are too many eggplants and broccoli ·········
- 216 — PUBLISH RECIPE

FIG.9A

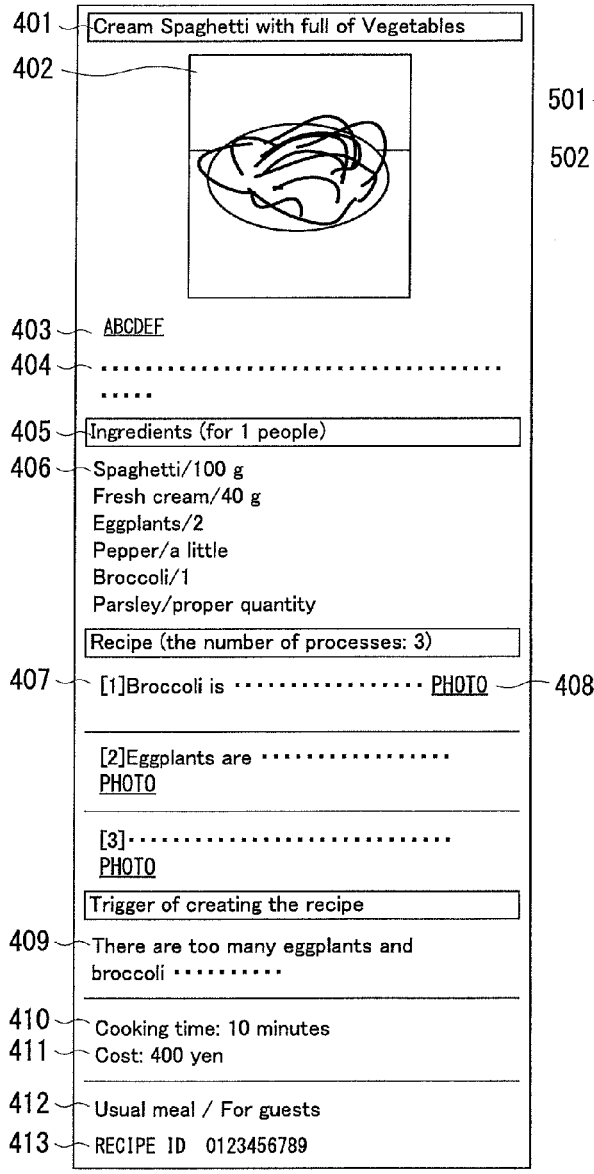

- 401 Cream Spaghetti with full of Vegetables
- 402 (image)
- 403 ABCDEF
- 404 ·······
- 405 Ingredients (for 1 people)
- 406 Spaghetti/100 g
  Fresh cream/40 g
  Eggplants/2
  Pepper/a little
  Broccoli/1
  Parsley/proper quantity
- Recipe (the number of processes: 3)
- 407 [1]Broccoli is ············ PHOTO — 408

[2]Eggplants are ············
  PHOTO

[3]························
  PHOTO
- Trigger of creating the recipe
- 409 There are too many eggplants and broccoli ··········
- 410 Cooking time: 10 minutes
- 411 Cost: 400 yen
- 412 Usual meal / For guests
- 413 RECIPE ID 0123456789

FIG.9B

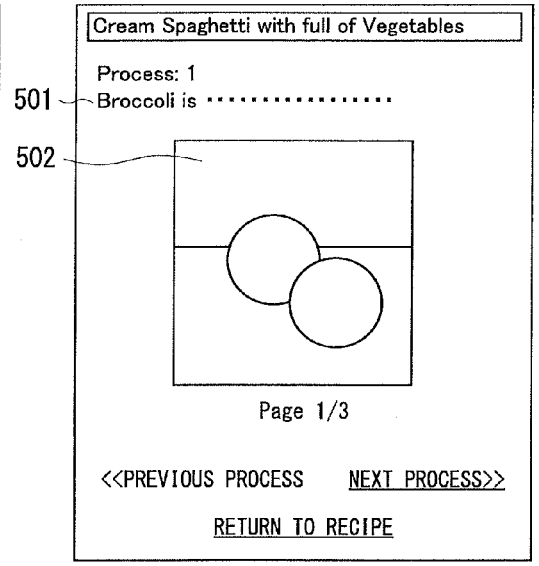

Cream Spaghetti with full of Vegetables

Process: 1
501 Broccoli is ···············
502 (image)

Page 1/3

<<PREVIOUS PROCESS   NEXT PROCESS>>
RETURN TO RECIPE

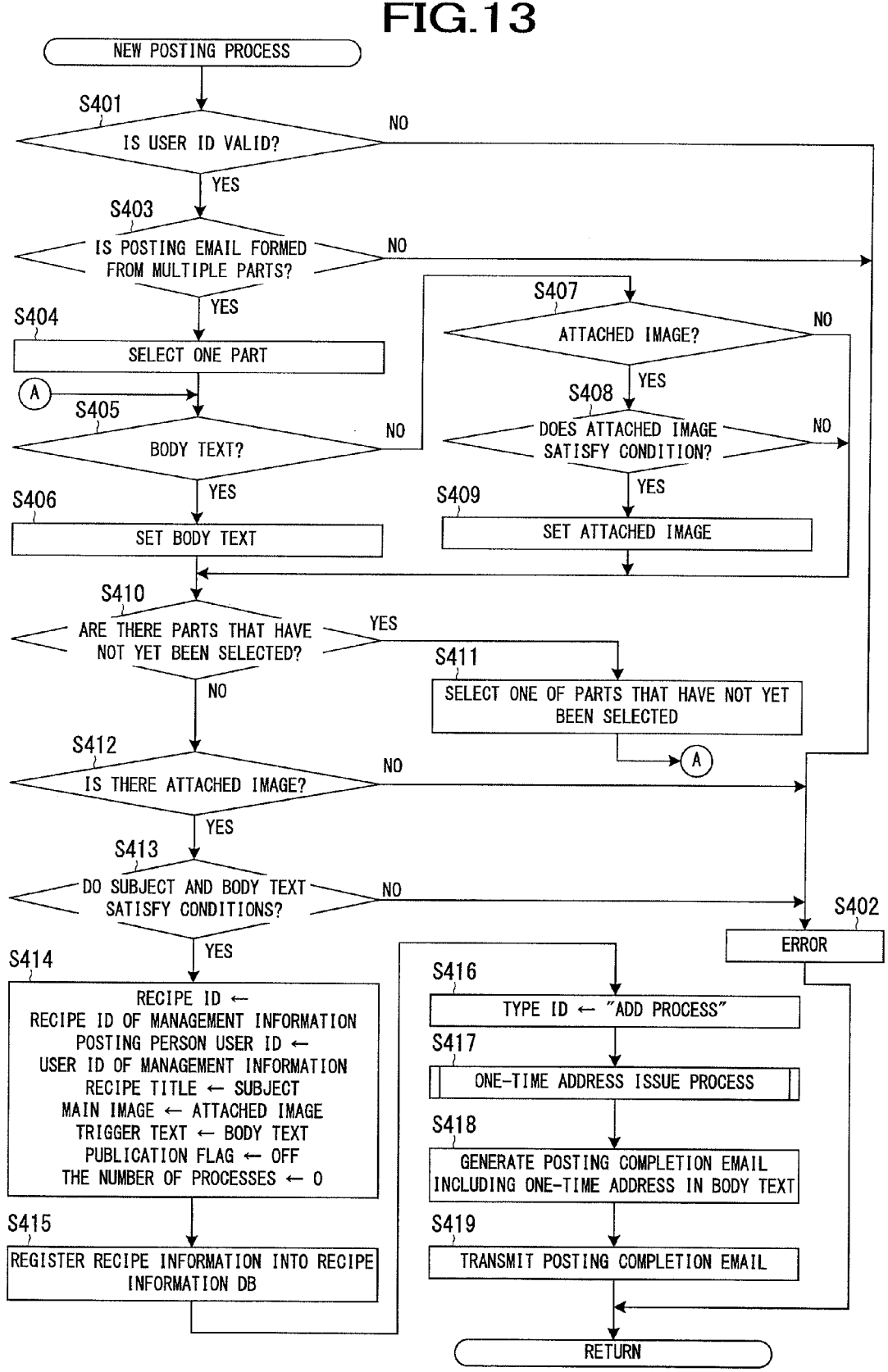

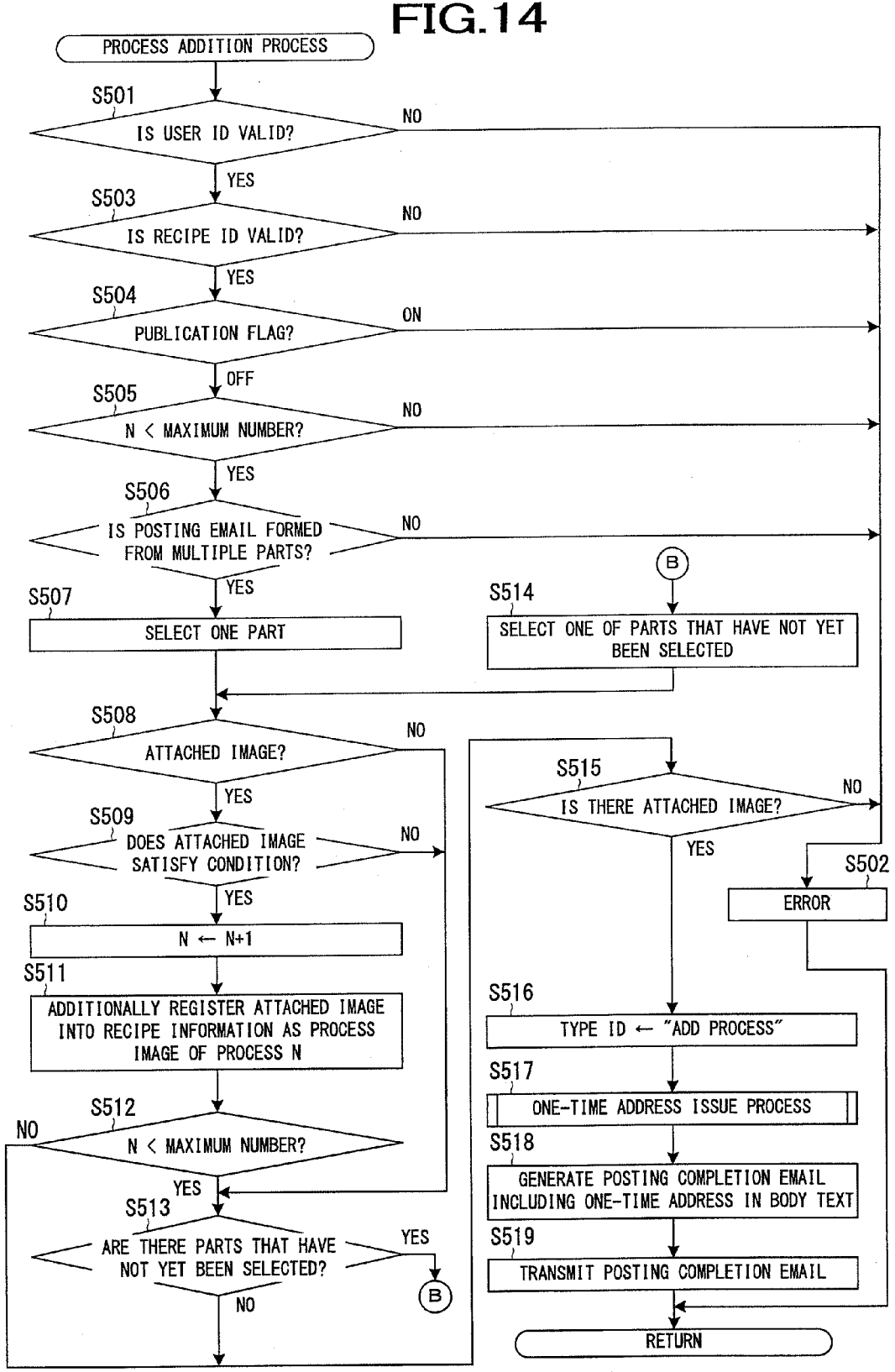

INFORMATION REGISTRATION APPARATUS, INFORMATION REGISTRATION METHOD, INFORMATION REGISTRATION PROGRAM, AND RECORDING MEDIUM

CROSS REFERENCE TO RELATED APPLICATIONS

This application is a National Stage of International Application No. PCT/JP2011/078462, filed on Dec. 8, 2011, which claims priority from Japanese Patent Application No. 2011-032199, filed Feb. 17, 2011, the contents of all of which are incorporated herein by reference in their entirety.

TECHNICAL FIELD

The present invention relates to a technical field of an information registration apparatus and an information registration method for registering information included in an email from a user as generation information in a system that generates a Web page by using the generation information including information to be a component of the Web page.

BACKGROUND ART

Conventionally, a Web site is known which can automatically generate a Web page even if a user does not create an HTML (HyperText Markup Language) document and the like. For example, a registration screen for inputting various information to be displayed on the Web page is displayed on a terminal apparatus. Information which a user inputs to the screen is transmitted from the terminal apparatus to a server device. The server device registers the received information into a database and generates a Web page including the information as components. Examples of the Web page generated in this way includes a Web page that displays information of a recipe posted by a user and a Web page that displays information of an item put-up for net auction. However, when a user makes a mobile terminal apparatus such as a mobile phone display a registration screen and performs an input operation, it takes time to complete registration because the size of the screen is small and it takes time to input characters and the like.

Therefore, Patent Literature 1 discloses a technique where a user sends an email with an image to a server device and the server device automatically generates a Web page. Specifically, the server device decomposes data of the email for each mail item included in the email, divides the decomposed data of each item into image data and information data, constructs databases of the image data and the information data, and generates a source file. When the received email is a first email, the server device generates an individual home page related to a newborn baby by using the source file. When the received email is a second or a later email, the server device additionally writes and posts data content described in the mail item of the second or the later email in a predetermined position on the generated individual home page. Whether the received email is the first email or the second or a later email can be determined by checking a name of a woman who has given birth to a baby, which is one of the mail items of the received email.

CITATION LIST

Patent Literature

Patent Literature 1: Japanese Patent Application Laid-Open No. 2004-46617

SUMMARY OF INVENTION

Technical Problem

However, according to the technique described in Patent Literature 1, one individual home page is generated for one woman who has given birth to a baby. In other words, each of a plurality of users cannot generate Web pages for a plurality of topics. For example, one user cannot post a plurality of recipes or put up a plurality of items for sale.

A person with whom the email received by the server concerned is determined by a name of a woman who has given birth to a baby, which is a mail item. Therefore, there is a problem that information that is not from the woman who has given birth to the baby is added to the individual home page related to the newborn baby of the woman who has given birth to the baby when an outsider sends an email using the name of the woman who has given birth to the baby as an mail item.

The present invention is made in view of the above problem and an object of the present invention is to provide an information registration apparatus, an information registration method, an information registration program, and a recording medium which makes it possible for a user to register generation information used to generate a Web page for each topic by sending element information to be a component of the Web page by an email and add element information to the registered generation information by an email and which can make it difficult for a person other than a person who registered the generation information to add element information to the generation information.

Solution to Problem

In order to achieve the above object, an invention described in claim 1 is an information registration apparatus for registering generation information including element information to be components of a Web page on the basis of an email transmitted from a terminal apparatus, the information registration apparatus comprising: a reception means that receives an email including the element information; a discrimination means that discriminates a receiver address being an email address included in the received email, the email address indicating a receiver; a registration means that registers the generation information included in the received email when the receiver address is discriminated as a first address for registering the generation information; a second transmission means that transmits an email addressed to a sender of the received email, the email transmitted by the second transmission means including a second address as an email address corresponding to the registered generation information, the second address being unique for each transmission, the second address being used to add the element information to the generation information; a determination means that determines whether or not the receiver address is the same as the receiver address included in an email having been received before by the reception means; and an addition means that adds the element information included in the currently received email to the generation information corresponding to the receiver address included in the received email when the receiver address is discriminated as the second address included in the email transmitted from the second transmission means and the receiver address is determined not to be the same as the receiver address included in the email having been received before.

According to this present invention, a user can register new generation information by putting a first address as a receiver address into an email including element information and causing a terminal apparatus to transmit the email. Thereby, the user can register generation information for each topic. An email that includes a unique second address for each transmission is transmitted to a sender of an email including element information. Therefore, the user can receive the email including the second address. The user puts the second address included in the received email as a receiver address into an email including element information to be added to the registered generation information and causes the terminal apparatus to transmit the email. Thereby, the user can add the element information to the generation information registered by the previous email. If the second address is not known by a person other than the user who acquires the second address by the email from the information registration apparatus, the person other than the user cannot add element information to the generation information. Even when the second address is known by an outsider, if the user who registered the generation information transmits an email, in which the receiver address is set to the second address, earlier than the outsider, information is not added by an email from the outsider. Thereby, it is possible to make it difficult to add element information by an email from a person other than the user who registered the generation information.

An invention described in claim 2 is the information registration apparatus according to claim 1, wherein the second transmission means transmits an email including the new second address corresponding to the generation information to which the element information is added by the addition means.

According to this invention, the user can acquire a new second address by an email transmitted from the information registration apparatus after the user transmits an email including element information to be added. Therefore, the user can add further element information to the generation information by causing the terminal apparatus to transmit an email in which the receiver address is set to the new second address. Thereby, the user can add element information to the generation information one after another.

An invention described in claim 3 is the information registration apparatus according to claim 2, wherein there is the generation information corresponding to a Web page for each Web page, and every time the generation information is registered by the registration means, the second transmission means transmits the email, which is addressed to the sender of the received email, including the second address corresponding to the registered generation information, and every time all the element information included in the received email are added by the addition means, the second transmission means transmits the email, which is addressed to the sender of the received email, including the new second address corresponding to the generation information to which the element information is added.

An invention described in claim 4 is the information registration apparatus according to any one of claims 1 to 3, further comprising: a time determination means that determines whether or not the email including the second address is received by the reception means within a predetermined time from when the email including the second address is transmitted by the second transmission means, wherein the addition means adds the element information included in the currently received email when the receiver address is discriminated as the second address, the receiver address is determined not to be the same as the receiver address included in an email having been received before, and the email including the second address is determined to be received within the time.

An invention described in claim 5 is the information registration apparatus according to any one of claims 1 to 4, further comprising: a user identification information reception means that receives user identification information for identifying a user from a terminal apparatus; and a first transmission means that transmits the first address to the terminal apparatus having transmitted the user identification information or transmits an email addressed to a user identified by the user identification information, the email transmitted by the first transmission means including the first address, the first address being unique for each transmission, the first address corresponding to the received user identification information, wherein, when the receiver address is discriminated as the first address and the receiver address is determined not to be the same as the receiver address included in an email having been received before, the registration means registers the generation information in association with the user identification information corresponding to the receiver address included in the currently received email.

According to this invention, the user causes the terminal apparatus to transmit the identification information of the user to the information registration apparatus, and then acquires the first address from the information registration apparatus. Then, the user puts the acquired first address as the receiver address into an email including element information and causes the terminal apparatus to transmit the email. Thereby, it is possible to register generation information associated with the identification information of the user. The first address included in the email transmitted from the information registration apparatus is an email address unique for each transmission. Even when the first address is known by an outsider, if the user who received the first address from the information registration apparatus transmits an email, in which the receiver address is set to the first address, earlier than the outsider, generation information associated with the identification information of the user cannot be registered by an email from the outsider. Thereby, it is possible to make it difficult for a person other than the user to successfully pretend to be the user and register generation information.

An invention described in claim 6 is the information registration apparatus according to claim 5, further comprising: a request reception means that receives a request for the first address from a terminal apparatus; a first address generation means that generates the first address every time the request is received by the request reception means; a first control means that stores address information and discrimination information in association with each other into a storage means, the address information indicating at least unique characters of characters included in the first address generated by the first address generation means, the discrimination information indicating that the email address is the first address; a second address generation means that generates the second address every time the generation information is registered by the registration means and generates the second address every time all the element information included in the received email is added by the addition means; and a second control means that stores address information, discrimination information and generation information identification information in association with each other into the storage means, the address information stored by the second control means indicating at least unique characters of characters included in the second address generated by the second generation means, the discrimination information stored by the second control means indicating that the email address is the second address, the generation information identification information identifying the generation information corresponding to the email address, the generation information identification information identifying either the generation information registered by the registration means in case of the receiver address being discriminated as the first address or the generation information to which the element information is added by the addition means in case of the receiver address being discriminated as the second address; wherein the first transmission means transmits the first address generated by the first address generation means or transmits an email including the first address, the second transmission means transmits the email including the second address generated by the second address generation means, the discrimination means discriminates the receiver address on the basis of the receiver address included in the received email, the address information stored in the storage means and the discrimination information stored in the storage means, and the addition means adds the element information included in the currently received email to the generation information identified by the generation information identification information corresponding to the address information of the receiver address included in the currently received email.

An invention described in claim 7 is the information registration apparatus according to any one of claims 1 to 5, further comprising: an identification information generation means that generates address identification information identifying the second address when the receiver address is discriminated as the first address; an address generation means that generates unique information to be unique characters of characters included in the second address on the basis of the generated address identification information and generates the second address including the unique information; and a storage means that stores the generated address identification information, the unique information included in the generated second address, and the generation information identification information identifying the generation information corresponding to the second address in association with each other, wherein the discrimination means discriminates that the receiver address is the second address when the unique information being the same as characters corresponding to the unique information in the receiver address is stored in the storage means, the registration means registers the generation information including the element information included in the received email in association with the generation information identification information identifying the generation information, the second transmission means transmits the email including the second address generated by the address generation means, and the addition means adds the element information to the generation information identified by the generation information identification information corresponding to the unique information included in the receiver address included in the received email.

According to this invention, information for identifying the generation information corresponding to the second address put as the receiver address in the received email is stored in the storage means. On the other hand, the second address is generated on the basis of the address identification information unique for each second address. Therefore, it is possible to generate the second address so that the second address is a unique email address for each transmission without using information for identifying the generation information. Thereby, even if the original address identification information is found out by analyzing the second address, it is not possible to identify the generation information from the address identification information. Thus, it is possible to prevent the second address from being fraudulently generated by a person who intends to add element information to certain generation information.

An invention described in claim 8 is the information registration apparatus according to any one of claims 1 to 7, wherein the reception means receives an email to which an image is attached as the element information.

According to this invention, the user can register an image to be a component of a Web page.

An invention described in claim 9 is the information registration apparatus according to any one of claims 1 to 8, wherein the registration means registers the generation information to be used to generate a Web page that displays a recipe, the generation information including the element information included in the received email.

According to this invention, it is possible to generate generation information for each recipe.

An invention described in claim 10 is the information registration apparatus according to claim 9, wherein the registration means registers the generation information including a subject and an image included in the received email as a title of the recipe and an image of a dish, and the addition means adds an image included in the received email as an image showing a cooking process to the generation information.

According to this invention, the user can register a title of the recipe and an image of the dish by the first transmitted email as components of a Web page. The user can additionally register an image that indicates a process of the cooking by the second transmitted email.

An invention described in claim 11 is the information registration apparatus according to any one of claims 1 to 10, wherein the reception means receives an email transmitted from a mobile terminal apparatus.

According to this invention, the user can register element information to be registered first and element information to be registered later from desired locations respectively by carrying a terminal apparatus used to transmit email.

An invention described in claim 12 is the information registration apparatus according to any one of claims 1 to 11, further comprising: a display information generation means that generates display information showing the element information included in the registered generation information, the display information being used to display a Web page, the display information showing the element information as components of the Web page; and a display information transmission means that transmits the generated display information to a terminal apparatus.

According to this invention, it is possible to generate a Web page when a user transmits element information by email.

An invention described in claim 13 is an information registration method of an information registration apparatus for registering generation information including element information to be components of a Web page on the basis of an email transmitted from a terminal apparatus, the information registration method comprising: a first reception step of receiving an email, the email including the element information and a first address as a receiver address being an email address indicating a receiver, the first address being used for registering the generation information; a registration step of registering the generation information included in the email received in the first reception step; a first transmission step of transmitting an email addressed to a sender of the received email, the email transmitted in the first transmission step including a second address as an email address corresponding to the registered generation information, the second address being unique for each transmission, the second address being used to add the element information to the generation information; a second reception step of receiving an email, the email received in the second reception step including the element information and the second address as the receiver address, the second address being included in the email transmitted in the first transmission step; a first determination step of determining whether or not the receiver address included in the email received in the second reception step is the same as the receiver address included in an email having been received before in the second reception step; and an addition step of adding the element information included in the currently received email to the generation information corresponding to the receiver address included in the email when the receiver address is determined not to be the same as the receiver address included in the email having been received before.

An invention described in claim 14 is an information registration program that causes a computer, which is included in an information registration apparatus for registering generation information including element information to be a component of a Web page on the basis of an email transmitted from a terminal apparatus, to function as: a reception means that receives an email including the element information; a discrimination means that discriminates a receiver address being an email address included in the received email, the email address indicating a receiver; a registration means that registers the generation information included in the received email when the receiver address is discriminated as a first address for registering the generation information; a second transmission means that transmits an email addressed to a sender of the received email, the email transmitted by the second transmission means including a second address as an email address corresponding to the registered generation information, the second address being unique for each transmission, the second address being used to add the element information to the generation information; a determination means that determines whether or not the receiver address is the same as the receiver address included in an email having been received before by the reception means; and an addition means that adds the element information included in the currently received email to the generation information corresponding to the receiver address included in the received email when the receiver address is discriminated as the second address included in the email transmitted from the second transmission means and the receiver address is determined not to be the same as the receiver address included in the email having been received before.

An invention described in claim 15 is a recording medium in which an information registration program is computer-readably recorded, the information registration program causing a computer, which is included in an information registration apparatus for registering generation information including element information to be a component of a Web page on the basis of an email transmitted from a terminal apparatus, to function as: a reception means that receives an email including the element information; a discrimination means that discriminates a receiver address being an email address included in the received email, the email address indicating a receiver; a registration means that registers the generation information included in the received email when the receiver address is discriminated as a first address for registering the generation information; a second transmission means that transmits an email addressed to a sender of the received email, the email transmitted by the second transmission means including a second address as an email address corresponding to the registered generation information, the second address being unique for each transmission, the second address being used to add the element information to the generation information; a determination means that determines whether or not the receiver address is the same as the receiver address included in an email having been received before by the reception means; and an addition means that adds the element information included in the currently received email to the generation information corresponding to the receiver address included in the received email when the receiver address is discriminated as the second address included in the email transmitted from the second transmission means and the receiver address is determined not to be the same as the receiver address included in the email having been received before.

Advantageous Effects of Invention

According to the present invention, a user can register new generation information by putting a first address as a receiver address into an email including element information and causing a terminal apparatus to transmit the email. Thereby, the user can register generation information for each topic. An email that includes a unique second address for each transmission is transmitted to a sender of an email including element information. Therefore, the user can receive the email including the second address. The user puts the second address included in the received email as a receiver address into an email including element information to be added to the registered generation information and causes the terminal apparatus to transmit the email. Thereby, the user can add the element information to the generation information registered by the previous email. If the second address is not known by a person other than the user who acquires the second address by the email from the information registration apparatus, the person other than the user cannot add element information to the generation information. Even when the second address is known by an outsider, if the user who registered the generation information transmits an email, in which the receiver address is set to the second address, earlier than the outsider, information is not added by an email from the outsider. Thereby, it is possible to make it difficult to add element information by an email from a person other than the user who registered the generation information.

BRIEF DESCRIPTION OF DRAWINGS

FIG. 3A is a diagram showing an example of content registered in a member information DB 12*a* according to the embodiment. FIG. 3B is a diagram showing an example of content registered in a recipe information DB 12*b* according to the embodiment. FIG. 3C is a diagram showing an example of content included in process information according to the embodiment. FIG. 3D is a diagram showing an example of content registered in a management information DB 12*c* according to the embodiment.

FIG. 4 is a sequence diagram showing a process example when posting recipe information using a posting email of the recipe information providing system S according to the embodiment.

FIG. 5A is a diagram showing a screen display example of an email posting page. FIG. 5B is a diagram showing a display example of a new email creation screen. FIG. 5C is a diagram showing a screen display example of a posting completion email. FIG. 5D is a diagram showing a display example of a new email creation screen. FIG. 5E is a diagram showing a screen display example of a posting email.

FIG. 6 is a sequence diagram showing a process example when posting recipe information using a posting page of the recipe information providing system S according to the embodiment.

FIG. 7 is a diagram showing a screen display example of the posting page.

FIG. 9A is a diagram showing a screen display example of a recipe page for a mobile phone 2. FIG. 9B is a screen display example of a process page.

FIG. 13 is a flowchart showing a process example of a new posting process of the system control unit 14 of the recipe server 1 according to the embodiment.

FIG. 14 is a flowchart showing a process example of a process addition process of the system control unit 14 of the recipe server 1 according to the embodiment.

DESCRIPTION OF EMBODIMENTS

Hereinafter, an embodiment of the present invention will be described in detail with reference to the drawings. The embodiment described below is an embodiment where the present invention is applied to a recipe information providing system in which recipe information is provided by a Web page.

[1. Schematic Configuration and Function of Recipe Information Providing System]

Figure 1:
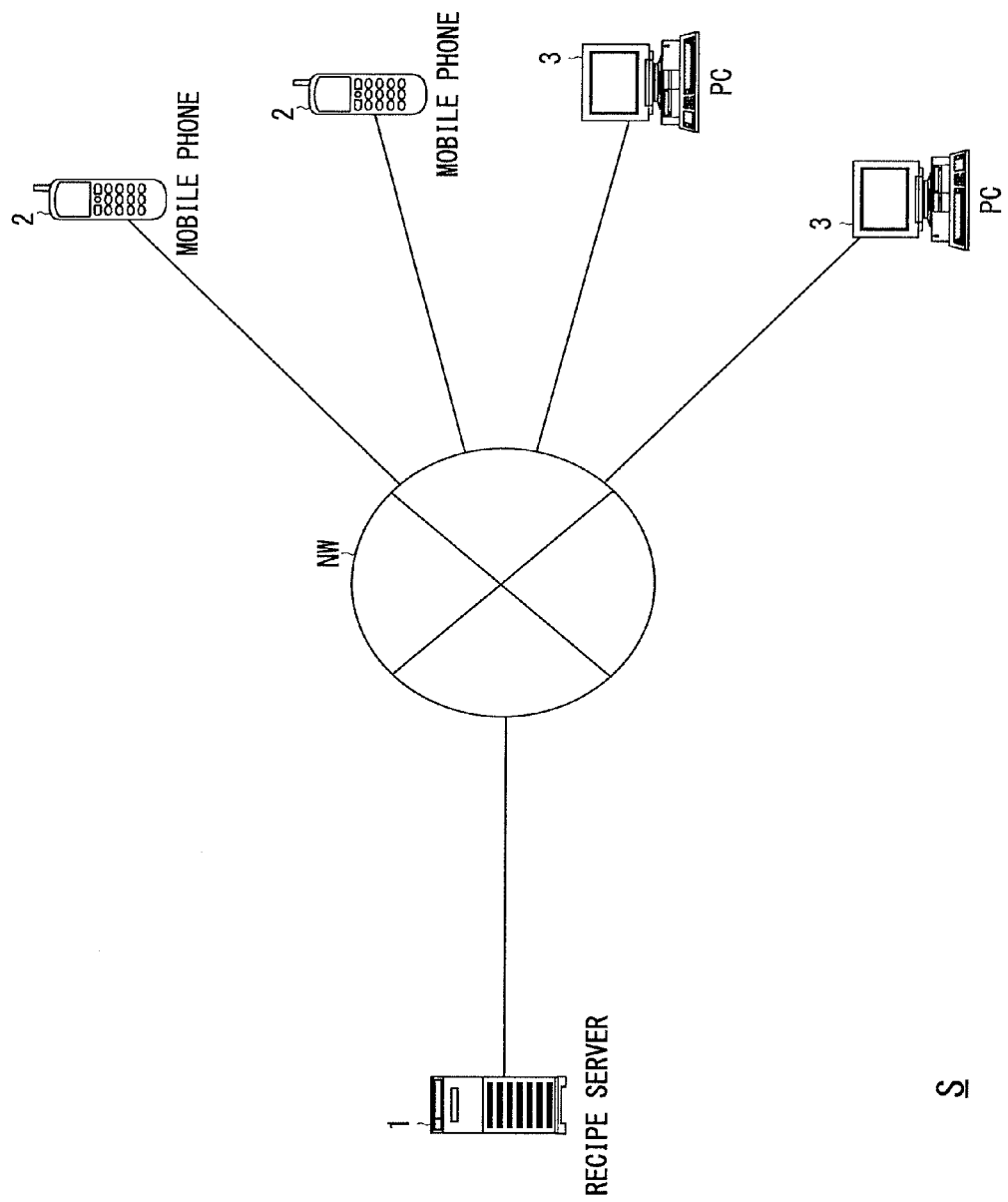
FIG. 1 is a diagram showing an example of a schematic configuration of a recipe information providing system S according to an embodiment.

First, configuration and function of a recipe information providing system S according to the embodiment will be described with reference to FIG. 1. FIG. 1 is a diagram showing an example of a schematic configuration of the recipe information providing system S according to the embodiment.

As shown in FIG. 1, the recipe information providing system S includes a recipe server 1 (an example of an information registration apparatus of the present invention), a plurality of mobile phones 2 (an example of mobile terminal apparatuses of the present invention), and a plurality of PCs (personal computers) 3. The recipe server 1, each mobile phone 2, and each PC 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including base stations and the like), and gateways.

The recipe server 1 is a server device that performs various processes related to the recipe site. The recipe site is a Web site that receives a posting of recipe information (an example of generation information in the present invention) representing a recipe from a user and publishes the posted recipe information on a Web page. The recipe information includes information such as a title of the recipe, an image of completed dish, images showing a cooking process, and a trigger to create the recipe. The recipe server 1 transmits a Web page of the recipe site according to a request from the mobile phone 2 and the PC 3. At this time, the recipe server 1 transmits a Web page having a certain layout to the mobile phone 2 and transmits a Web page having a layout different from the certain layout to the PC 3. This is because to make contents on the Web page easy to see according to the screen sizes of the mobile phone 2 and the PC 3. Web pages of the recipe site include recipe pages. The recipe page is a Web page that displays one piece of recipe information. In other words, there is recipe information corresponding to a recipe page for each recipe page. The recipe server 1 performs a process to register the posted recipe information according to a request from the mobile phone 2 and the PC 3. The recipe server 1 generates a recipe page based on the registered recipe information.

The mobile phones 2 and the PCs 3 are terminal apparatuses of users who use the recipe site. The mobile phone 2 and the PC 3 access the recipe server 1 on the basis of an operation from a user. Thereby, the mobile phone 2 and the PC 3 receive a Web page from the recipe server 1 and display the Web page. In the mobile phone 2 and the PC 3, software such as a browser and an email client is installed. Among users, there are a user who has either one of the mobile phone 2 and the PC 3 and a user who has both of the mobile phone 2 and the PC 3.

The mobile phone 2 includes a digital camera. A user can capture an image of completed dish and images showing a cooking process by using the mobile phone 2.

A posting page is prepared for a user to post recipe information by using the mobile phone 2 and the PC 3. The posting page is a Web page for inputting recipe information to be posted and editing the posted recipe information. The user has to input and specify a lot of information to post the recipe information. Therefore, the display size of the posting page is large. The horizontal size of the Web page for the mobile phone 2 is matched to the horizontal size of the screen of the mobile phone 2. Therefore, the posting page for the mobile phone 2 is a vertically long Web page. The mobile phone 2 cannot display the entire posting page in one screen, so that the user needs to vertically scroll the posting page to input necessary information. The mobile phone 2 takes longer time to input characters and the like than the PC 3. Therefore, a posting operation using the mobile phone 2 takes time and effort.

Thus, in the recipe information providing system S, a user can post a part of information included in the recipe information from the mobile phone 2 by an email. The email is referred to as "posting email." Specifically, the recipe server 1 uses an image attached to the posting email transmitted for the first time by the user as a main image of the recipe information. The main image is a static image displayed on the Web page that displays a list of the recipe information as a representative image of the recipe information. Normally, an image of completed dish is used as the main image. As the Web page that displays a list of the recipe information, for example, there is a Web page that shows a search result of the recipe information. The recipe server 1 uses the subject and the body text of the posting email transmitted for the first time by the user as a title and a text indicating a trigger by which the recipe is created (hereinafter referred to as a "trigger text"). The recipe server 1 registers the recipe information including the main image, the title of the recipe, and the trigger text into a database as a draft. The draft of the recipe information is recipe information that is registered in the recipe site but not published yet.

Thereafter, the recipe server 1 uses images attached to the posting email transmitted for the second time and later by the user as process images of the recipe information. The process images are static images showing the process of the cooking. There are one or more cooking processes in one recipe. Thus, there are one or more process images in one recipe information. The recipe server 1 additionally registers the process image attached to the posting email to the draft of the recipe information that has been already registered. The main image, the recipe title, the trigger text, and the process images are examples of the element information of the present invention.

The user can transmit an image captured by the mobile phone 2 by an email at any time. In other words, the user can transmit an image and the like from any convenient place at any convenient time. For example, while the user is actually cooking dish, the user can capture images of the cooking processes at any time and transmit the images on site. In this way, the user can register the images included in the recipe information into the recipe site in advance.

Thereafter, the user can input necessary information other than the images or change the images from the posting page. At this time, if the user has the PC 3, the user can perform the posting operation by using the PC 3. In this case, the main image and the process images are registered in advance, so that the user need not transfer the images captured by the mobile phone 2 to the PC 3 and then register the images by the posting page.

By the way, when a user performs a posting operation from the positing posting page, the recipe server 1 identifies the user who performs the posting operation by performing password authentication in advance. On the other hand, when the user posts an image and the like by a posting email, the recipe server 1 cannot perform the password authentication. Therefore, a mechanism for identifying a user is required when posting is performed by a posting email. In other words, it is necessary to prevent that a malicious person can successfully pretend to be the user and fraudulently post an image and the like which are not intended to be posted by the user. At this time, when the first posting email is a posting email from the user but the second or a later posting email is a posting email from a person other than the user, it is necessary to reject the posting by the second or the later posting email.

Therefore, the recipe server 1 issues a one-time address. The one-time address is an email address that is allowed to be specified as an email address indicating a receiver of a posting email. The email address indicating a receiver is an email address that is put in the To field. Hereinafter, the email address indicating a receiver is referred to as a "receiver address." Issuing the one-time address means providing a new one-time address to a user. The one-time address is a unique email address which is generated to be different from any other one-time address that has been issued before every time the one-time address is issued. A posting by a posting email that specifies a certain one-time address as a receiver address is allowed one time only. The user creates a posting email by specifying the one-time address notified from the recipe server 1 as the receiver address. The details of an issue process of the one-time address, a method for specifying a user by using the one-time address, and a method for preventing a fraudulent posting by an outsider will be described later.

[2. Configuration of Recipe Server]

Next, a configuration of the recipe server 1 will be described with reference to FIGS. 2 and 3.

Figure 2:
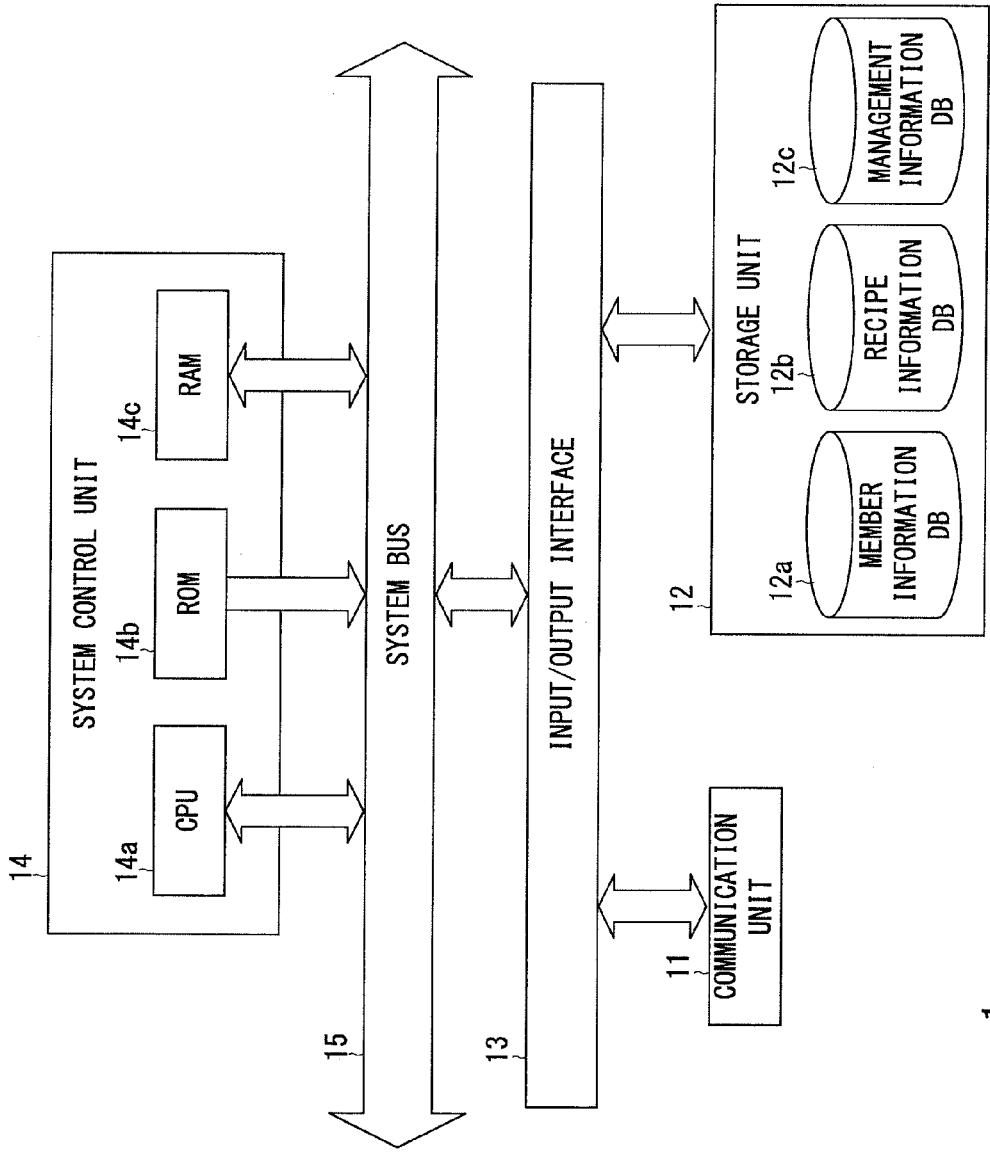
FIG. 2 is a block diagram showing an example of a schematic configuration of a recipe server 1 according to the embodiment.

FIG. 2 is a block diagram showing an example of a schematic configuration of the recipe server 1 according to the present embodiment. As shown in FIG. 2, the recipe server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the mobile phone 2 and the PC 3 and the like.

The storage unit 12 (an example of a storage means of the present invention) includes, for example, a hard disk drive and the like. In the storage unit 12, databases such as a member information DB (database) 12a, a recipe information DB 12b, and a management information DB 12c are constructed.

FIG. 3A is a diagram showing an example of content registered in the member information DB 12a according to the present embodiment. In the member information DB 12a, member information related to users registered in the recipe site as a member is registered. Specifically, in the member information DB 12a, a user ID (an example of user identification information of the present invention) which is identification information of the user, a password, a nickname, a name, a date of birth, a gender, an address, a phone number, an email address of the mobile phone 2, an email address of the PC 3, and the like are registered in association with each user. The email address of the mobile phone 2 is an email address provided by a mobile network operator. Basically, an email having the email address of the mobile phone 2 as a receiver address can be received by only the mobile phone 2. The email address of the PC 3 is not an email address provided by a mobile network operator. An email having the email address of the PC 3 as a receiver address can be received by only the PC 3.

FIG. 3B is a diagram showing an example of content registered in the recipe information DB 12b according to the present embodiment. In the recipe information DB 12b, recipe information is registered. Specifically, in the recipe information DB 12b, a recipe ID (an example of generation identification information of the present invention), a posting person user ID, a publication flag, a publication date, a recipe title, a dish name, a main image, ingredient names and amounts of ingredients, a comment, process information, a cooking time, a cost of the ingredients, use of the dish, a trigger text, and the like are registered in association with each other for each posted recipe.

The posting person user ID is a user ID of a user who posted the recipe. The publication flag is information indicating whether or not the posted recipe is published. When the publication flag is set to OFF, it is indicated that the recipe information is not published, and when the publication flag is set to ON, it is indicated that the recipe information is published. The recipe information that is not published is recipe information that is in a draft state. When the user selects to publish the recipe information, the publication flag is changed from OFF to ON.

FIG. 3C is a diagram showing an example of content included in the process information according to the present embodiment. The process information is information indicating the process of the cooking. Specifically, the number of processes is included in the process information. Also in the process information, a process text and a process image are included for each process. The number of the pairs of the process text and the process image corresponds to the number of the processes. The process text is a text indicating content of the process.

FIG. 3D is a diagram showing an example of content registered in the management information DB 12c according to the present embodiment. In the management information DB 12c, management information for managing one-time addresses is registered. The management information is also information for determining processing when the recipe server 1 receives a posting email. Specifically, in the management information DB 12c, a management ID (an example of address identification information of the present invention), a type ID (an example of discrimination information of the present invention), an issue target recipe ID, an issue target user ID, a one-time mail box name (an example of unique information and address information of the present invention), an issue date and time, and a reception flag are registered for each issued one-time address.

The management ID is identification information of the management information. For example, the management ID starts from 000001 and is provided in order of registration of the management information. The type ID is identification information for identifying use of the corresponding one-time address. The type ID is set to "new posting" or "add process". The "new posting" is a type ID indicating that the one-time address is used to newly register recipe information. Also, the "new posting" is a type ID indicating that the image attached to the posting email is used as the main image and the subject and the body text of the posting email are used as the recipe title and the trigger text. The "add process" is a type ID indicating that the one-time address is used to add a process image to recipe information that has already been registered. Also, the "add process" is a type ID indicating that the image attached to the posting email is used as a process image. The discrimination information is information indicating whether the corresponding one-time address is a one-time address corresponding to the "new posting" or a one-time address corresponding to the "add process." The one-time address corresponding to the "new posting" is an example of a first address of the present invention. The one-time address corresponding to the "add process" is an example of a second address of the present invention.

The issue target recipe ID is a recipe ID of recipe information in which information such as an image included in a posting email where the corresponding one-time address is specified as the receiver address is registered. The issue target user ID is a user ID of the user to whom the corresponding one-time address is issued. When the type ID is the "new posting," the issue target recipe ID is a recipe ID of recipe information to be newly registered. When the type ID is the "add process," the issue target recipe ID is a recipe ID of recipe information to which a process image will be added.

The one-time mail box name is a mail box name included in an issued one-time address. The recipe server 1 generates a one-time mail box name by hashing a plain text including information such as a management ID by using a predetermined hash function. The management ID is identification information unique for each generated one-time address. Therefore, the one-time mail box name generated based on the management ID is a mail box name that is basically different from one-time mail box names included in the other one-time email addresses. In other words, the one-time mail box name is information that indicates at least unique characters in a plurality of characters included in the one-time address. On the other hand, domain names included in all one-time addresses are the same. The domain name is a domain name for posting recipe information. Therefore, when the one-time mail box name is determined, the one-time address is also determined. The posting email received by the recipe server 1 need not be stored after the posting email is used for the process of the recipe server 1. Therefore, a mail box corresponding to the one-time mail box name is not generated.

The issue date and time indicates a date and time when the corresponding one-time address is issued. In other words, the issue date and time indicates a date and time when a posting completion email including the corresponding one-time address is transmitted. When a predetermined period of time (for example, one month) elapses from when a one-time address is issued, the issued one-time address becomes invalid. The recipe server 1 rejects a posting performed by a posting email in which a receiver address is set to an invalid one-time address. The longer the time from when a one-time address is issued, the higher the possibility that the one-time address is known by an outsider. Therefore, an expiration date and time is set in order to reduce the possibility that one-time address is fraudulently used.

The reception flag indicates whether or not a posting email in which the corresponding one-time address is specified as a receiver address is received. When the reception flag is set to OFF, it is indicated that a posting email is not received, and when the reception flag is set to ON, it is indicated that the posting email is received. The reception flag is information used to allow a posting only once, which is performed by a posting email in which an issued one-time address is specified as a receiver address.

Next, information stored in the storage unit 12 will be described. The storage unit 12 stores various data such as HTML (Hyper Text Markup Language) documents, XML (Extensible Markup Language) documents, image data, text data, and electronic documents that forms a Web page of the recipe site.

Also, the storage unit 12 stores various programs such as an operating system, a WWW (World Wide Web) server program, an SMTP (Simple Mail Transfer Protocol) server program, a DBMS (DataBase Management System), and a recipe information management program. The recipe information management program is a program for performing various processes related to the recipe site. For example, the various programs (including an example of an information registration program of the present invention) such as the recipe information management program may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU (Central Processing Unit) 14a, a ROM (Read Only Memory) 14b, a RAM (Random Access Memory) 14c, and the like. The CPU 14a reads and executes various programs, so that the system control unit 14 functions as a reception means, a discrimination means, a registration means, a transmission means, a determination means, an addition means, a first transmission means, a second transmission means, an identification information generation means, a first address generation means, a display information generation means, a display information transmission means, a time determination means, a request reception means, a first control means, a second address generation means, and a second control means of the present invention.

The recipe server 1 may include a plurality of server devices. For example, a server device that performs registration of recipe information and the like, a server device that transmits a Web page of the recipe site according to a request from the mobile phone 2 and the PC 3, a server device that transmits and receives emails, a server device that manages database, and the like may be connected to each other by a LAN or the like.

[3. Operation of Recipe Information Providing System]

Next, an operation of the recipe information providing system S will be described with reference to FIGS. 4 to 14.

[3-1. Operation of Entire Recipe Information Providing System]

FIG. 4 is a sequence diagram showing a process example when posting recipe information using a posting email of the recipe information providing system S according to the present embodiment.

For example, a user X logs in to the recipe site before posting recipe information by an email. At this time, the user X inputs a user ID and a password into a mobile phone 2-1. The mobile phone 2-1 transmits the inputted user ID and password to the recipe server 1. When the recipe server 1 receives the user ID and the password as a user identification information reception means, the recipe server 1 performs password authentication on the basis of the received information. At this time, the recipe server 1 acquires a subscriber unique ID. The subscriber unique ID is unique identification information provided to a subscriber of the mobile phone 2 from a mobile network operator. A name of the subscriber unique ID may be different depending on a mobile network operator. For example, the subscriber unique ID is added to a request transmitted from the mobile phone 2 by a gateway server of the mobile network operator or added to the request by the mobile phone 2 itself. When the recipe server 1 successfully performs the password authentication, the recipe server 1 stores the user ID and the subscriber unique ID in association with each other. Thereafter, the recipe server 1 can acquire the user ID from the subscriber unique ID added to the request transmitted from the mobile phone 2-1. The recipe server 1 can identify the user by the acquired user ID. The recipe server 1 may add the received user ID to a URL to which a href attribute of an "a" tag included in an HTML document transmitted to the mobile phone 2-1 is set (the added user ID may be encrypted). Thereby, the user ID is added to a URL included in a request transmitted from the mobile phone 2-1 to the recipe server 1. Thereby, the recipe server 1 can receive the user ID from the mobile phone 2-1 that transmits a request to the recipe server 1.

Thereafter, as shown in FIG. 4, the user X selects a posting performed by an email on a Web page of the recipe site (step S1). Then, the mobile phone 2-1 transmits a request of an email posting page to the recipe server 1 (step S2). The email posting page is a Web page for providing a new one-time address to the user. The request of the email posting page is an example of a request of the first address. When the recipe server 1 receives the request of the email posting page, the recipe server 1 generates a one-time address (step S3). In other words, the recipe server 1 generates a one-time address every time receiving the request of the email posting page. At this time, the recipe server 1 registers management information. In the management information, a newly generated management ID, an acquired user name, a new recipe ID, a mail box name of the generated one-time address and the like are included. As the type ID, "new posting" is further included.

Next, the recipe server 1 transmits an email posting page including an email link of the generated one-time address to the mobile phone 2-1 (step S4). The email link is a link in which the href attribute of the "a" tag is set to an email address in a format of "mailto: email address." The mobile phone 2-1 displays the received email posting page on a screen.

FIG. 5A is a diagram showing a screen display example of the email posting page. As shown in FIG. 5, a link 101 is displayed on the email posting page. The link 101 is an email link of the one-time address. When the user X selects the link 101 (step S5), the mobile phone 2-1 starts email client software to display a new email creation screen (step S6). The new email creation screen is a screen for creating a new email.

FIG. 5B is a diagram showing a display example of the new email creation screen. As shown in FIG. 5B, on the new email creation screen, a destination input field 111, a subject input field 112, an attached file display field 113, and a body text input field 114. The destination input field 111 is an input field for inputting a receiver address of the email. In the destination input field 111, the one-time address generated in step S3 is put in advance. The subject input field 112 is an input field for inputting a subject of the email. In the attached file display field 113, a file name of a file attached to the email is displayed. The body text input field 114 is an input field for inputting a body text of the email. When the email client software is started, nothing is included in the subject input field 112, the attached file display field 113, and the body text input field 114.

The user X inputs a recipe title in the subject input field 112. The user X specifies an image to be the main image of the recipe information as an attached file. Also, the user X inputs a trigger text in the body text input field 114 (step S7). Then, as shown in FIG. 5B, the recipe title, a file name of the attached image, and the trigger text are displayed in the subject input field 112, the attached file display field 113, and the body text input field 114. The input of the recipe title and the trigger text can be omitted. Thereafter, the user X selects transmission of the email. Then, the mobile phone 2-1 transmits a posting email including the attached image, inputted subject and body text (step S8). The posting email is transferred to the recipe server 1 by an email server on the basis of the receiver address.

When the recipe server 1 receives the posting email, the recipe server 1 determines whether or not the receiver address of the posting email is valid as a one-time address (step S9). For example, the recipe server 1 determines whether or not the corresponding management information is registered, whether or not the receiver address is the same as that of a posting email that has been received before, whether or not the expiration date and time is passed, and the like. At this time, if the recipe server 1 determines that the receiver address is not valid as a one-time address, the recipe server 1 rejects the posting email. In other words, the recipe server 1 does not register the recipe information. On the other hand, if the recipe server 1 determines that an email address specified as the receiver address is valid as a one-time address, the recipe server 1 registers information included in the posting email. Here, the type ID of the management information is "new posting." Therefore, the recipe server 1 newly registers the recipe information as a draft (step S10). At this time, the recipe server 1 uses the issue target recipe ID and the issue target user ID stored in the management information as a recipe ID and a user ID to be associated with the recipe information.

The one-time address is an email address unique for each issue. The one-time address issued to newly register recipe information is issued in a state in which a user is logged in to the recipe site. In other words, the one-time address is issued in a state in which the user is identified by the password authentication. The user ID of the identified user is included in the management information. Therefore, the recipe server 1 can identify the user from the user ID included in the management information corresponding to the one-time address specified as the receiver address of the posting email.

The one-time address can be put only once as the receiver address into the posting email. Therefore, even if the one-time address is known by another person, the user may transmit a posting email using the issued one-time address earlier than the other person. Thereafter, if the other person transmits a posting email using the same one-time address, the posting email is rejected. The one-time address is also effective against a brute force attack. Specifically, it is assumed that the other person generates combinations of characters that can be specified as the receiver address of the posting email as much as possible and transmits the posting emails one after another. In this case, even when a receiver address generated by the other person coincidentally matches the issued one-time address, if the user transmits the posting email earlier than the other person, the posting email from the other person is rejected. Even if the user does not transmit the posting email, the posting email from the other person is rejected after the expiration date and time is reached. Therefore, it is possible to make it difficult for a person other than a person who registered the recipe information to successfully pretend to be the person who registered the recipe information and register recipe information by a posting email.

Also, it is effective that the one-time address can be put only once as the receiver address into the posting email in order to prevent an erroneous registration by a user. Specifically, it is possible to prevent a user from newly registering recipe information by mistake or faultily adding a process image by putting the same one-time address as the receiver address into the posting email.

When the recipe server 1 registers the recipe information, the recipe server 1 generates a new one-time address (step S11). In other words, the recipe server 1 generates a one-time address every time the recipe server 1 registers recipe information. At this time, the recipe server 1 registers new management information. The new management information inherits the issue target recipe ID and the issue target user ID included in the management information registered in step S3. Also, "add process" is put as the type ID into the new management information. Next, the recipe server 1 transmits a posting completion email including the generated one-time address in the body text (step S12). The posting completion email is an email notifying that the posted information has been registered. The receiver address of the posting completion email is set to the email address of the mobile phone 2-1 of the user X. Therefore, the recipe server 1 transmits the posting completion email addressed to the user X. The email address indicating the sender included in the posting email is set to the email address of the mobile phone 2-1 of the user X. The email address indicating the sender is an email address put in the From field. Therefore, the recipe server 1 can acquire the email address of the mobile phone 2-1 of the user X. Hereinafter, the email address indicating the sender is referred to as a "sender address."

The user operates the mobile phone 2-1, so that the user starts the email client software and causes the mobile phone 2-1 to receive the posting completion email from the email server. Then, the mobile phone 2-1 displays the posting completion email on the screen.

FIG. 5C is a diagram showing a screen display example of the posting completion email. As shown in FIG. 5C, in the body text of the posting completion email, a message indicating that the posting is completed is displayed. Also, in the body text of the posting completion email, an email address 121 is displayed. The email address 121 is the one-time address generated in step S11.

When the user X selects the email address 121 (step S13), the mobile phone 2-1 starts the email client software to display a new email creation screen (step S14).

FIG. 5D is a diagram showing a display example of the new email creation screen. As shown in FIG. 5D, in the destination input field 111, the one-time address indicated by the email address 121 is put in advance. The user X specifies an image to be a process image as an attached file (step S15). Then, as shown in FIG. 5D, in the attached file display field 113, a file name of the attached image is displayed. At this time, the user X may specify a plurality of process images as attached files. Thereafter, the user X selects transmission of the email. Then, the mobile phone 2-1 transmits the posting email including the attached image (step S16).

When the recipe server 1 receives the posting email, in the same manner as in step S9, the recipe server 1 determines whether or not the receiver address of the posting email is valid as a one-time address (step S17). If the recipe server 1 determines that the receiver address is valid, the recipe server 1 registers information included in the posting email. Here, the type ID of the management information is "add process." Therefore, the recipe server 1 adds the image attached to the posting email to the recipe information, which has already been registered, as a process image (step S18). Also, at this time, the recipe server 1 uses the issue target recipe ID included in the management information as a recipe ID of the recipe information to which the image is add.

The receiver address of the posting completion email transmitted in step S12 is set to the sender address of the posting email transmitted in step S8. Thereby, it is guaranteed that the posting completion email is transmitted to the sender of the posting email. When the recipe information is newly registered in step S10, the user who posted the recipe information is identified. Therefore, the one-time address issued by transmitting the posting completion email is issued in a state in which the user is identified. Therefore, the recipe server 1 can also identify the user when adding a process image to the recipe information in the same manner as when newly registering the recipe information. Further, in the same manner as when newly registering the recipe information, the recipe server 1 can make it difficult for a person other than a person who registered the recipe information to add a process image to the recipe information by a posting email.

When the recipe server 1 adds the process image to the recipe information, in the same manner as in steps S11 and S12, the recipe server 1 generates a new one-time address (step S19) and transmits a posting completion email (step S20). In other words, the recipe server 1 generates a one-time address every time adding all of one or more process images included in a posting email. The mobile phone 2-1 receives the posting completion email and displays the posting completion email on the screen. FIG. 5E is a diagram showing a screen display example of the posting completion email. As shown in FIG. 5E, in the body text, the one-time address generated in step S19 is displayed as the email address 121.

If necessary, the user X specifies an image to be a process image as an attached file and causes the mobile phone 2 to transmit a posting email. In this way, the process from step S13 to step S20 is repeatedly performed as needed.

When the user posts new recipe information, the user may cause the mobile phone 2 to display the email posting page again. Thereby, a new one-time address is issued. The one-time address issued by the email posting page is associated with management information whose type ID is "new posting." When the type ID indicating the "new posting" is set, the recipe server 1 newly registers the recipe information. Therefore, each user can post a plurality of pieces of recipe information.

Into the management information corresponding to the one-time address issued by the posting completion email, the recipe ID is put when the recipe information is newly registered. The type ID included in the management information is "add process." When the type ID indicating the "add process" is set, the recipe server 1 adds a process image to the recipe information corresponding to the recipe ID included in the management information. Therefore, each user can add a process image to each of a plurality of pieces of registered recipe information.

When a user performs a posting by using a posting email, the user need not specify whether to newly post recipe information or to add information to the recipe information. Further, the user need not specify whether the image attached to the posting email is the main image or a process image. The receiver address of the posting email is automatically set to the one-time address. Therefore, when a user adds a process image, the user need not specify to which recipe information the process image is added and need not input or change the receiver address according to the recipe information to which the process image is added. The user only has to input or attach information to be posted and transmit the posting email. Therefore, the user can easily post a plurality of pieces of recipe information and add information to each of the plurality of pieces of recipe information.

FIG. 6 is a sequence diagram showing a process example when posting recipe information using a posting page of the recipe information providing system S according to the present embodiment.

The user X performs a posting using a posting email, and then edits recipe information registered as a draft from the posting page. Here it is assumed that the user X performs the editing operation by using a PC 3-1 owned by the user X.

The user X causes the PC 3-1 to display a Web page showing a list of drafts of the recipe information posted by the user X. As shown in FIG. 6, the user X selects a piece of recipe information which the user X wants to edit from the list (step S51). Then, the PC 3-1 transmits a request of a posting page to the recipe server 1 (step S52). The request of a posting page includes the recipe ID of the selected recipe information. When the recipe server 1 transmits the request of a posting page, the recipe server 1 transmits the posting page to the PC 3-1 (step S53). Specifically, the recipe server 1 acquires recipe information, which corresponds to the recipe ID included in the received request, from the recipe information DB 12b. Next, the recipe server 1 generates an HTML document of the posting page based on the acquired recipe information. Then, the recipe server 1 transmits the generated HTML document to the PC 3-1. The PC 3-1 displays the posting page on a screen on the basis of the received HTML document.

FIG. 7 is a diagram showing a screen display example of the posting page. The posting page shown in FIG. 7 is a posting page for the PC 3. As shown in FIG. 7, in the posting page, a recipe ID display field 201, a recipe title display field 202, a dish name display field 203, a number of target people display field 204, a display field 205 of ingredient names and amounts of the ingredients, a main image display field 206, a comment display field 207, a nickname display field 208, a plurality of process display fields 209, a cooking time display field 212, an ingredient cost display field 213, a use display field 214, a trigger text display field 215, a publishing button 216, and the like are displayed.

In the recipe ID display field 201, the recipe ID is displayed. In the recipe title display field 202, the recipe title, which is inputted by the user as the subject of the first posting email, is displayed. In the main image display field 206, the image, which is attached to the first posting email by the user, is displayed. In the nickname display field 208, a nickname of the user who posts the recipe information is displayed. In each process display field 209, a process text display field 210 and a process image display field 211 are displayed. In the process image display field 211, an image, which is attached to the second or a later posting email by the user, is displayed. For example, when the user attaches two process images to the posting email or attaches one process image to each of two posting emails, as shown in FIG. 7, the process images are displayed in the process image display fields 211 of the two process display fields 209, respectively. In the trigger text display field 215, the trigger text, which is inputted by the user as the body text of the first posting email, is displayed. In the other display fields, no corresponding information is displayed.

In the posting page, the user can perform various editing operations (step S54). For example, when the user selects a display field, the user can input and change information displayed in the selected display field. Also, when the user selects the main image display field 206 or the process display field 209, the user can change the image displayed in the selected display field. The user can add or delete the process display field 209. The user can change the arrangement order of the process display fields 209. The process display fields 209 correspond to the order of the processes. The recipe ID and the nickname cannot be changed.

Every time the user X performs an editing operation, the PC 3-1 transmits inputted information, changed information, or a changed image to the recipe server 1 as editing information (step S55). The editing information includes the recipe ID. In the recipe information DB 12b, the recipe server 1 updates the recipe information corresponding to the recipe ID included in the received editing information (step S56). Specifically, the recipe server 1 adds information included in the editing information into the recipe information or overwrites the corresponding information in the recipe information with information included in the editing information.

Thereafter, when the user X selects the publishing button 216, the PC 3-1 transmits a publication request including the recipe ID to the recipe server 1 (step S57). In the recipe information DB 12b, the recipe server 1 changes the publication flag in the recipe information corresponding to the recipe ID included in the received publication request to ON. As the display information generation means, the recipe server 1 generates a recipe page including information pieces, which are included in the recipe information corresponding to the recipe ID included in the received publication request, as components (step S58). Specifically, the recipe server 1 generates an HTML document in which information pieces of each text included in the recipe information are contained at predetermined positions. Also, the recipe server 1 puts URLs of the main image and the process images included in the recipe information into src attributes of corresponding img tags respectively. The recipe server 1 generates an HTML document for the mobile phone 2 and an HTML document for the PC 3. Then, the recipe server 1 stores the generated HTML documents into the storage unit 12. The recipe server 1 also generates an HTML document of a process page described later as an HTML document for the mobile phone 2.

Thereafter, a certain user Y operates a PC 3-2 to browse a recipe page. Then, the PC 3-2 transmits a request of the recipe page to the recipe server 1 (step S59). The recipe server 1 transmits the recipe page corresponding to the received request to the PC 3-2 (step S60). Specifically, the recipe server 1 acquires an HTML document corresponding to the URL included in the request from the storage unit 12. Then, as the display information transmission means, the recipe server 1 transmits the acquired HTML document to the PC 3-2. The PC 3-2 displays the recipe page on a screen by using the received HTML document.

Figure 8:
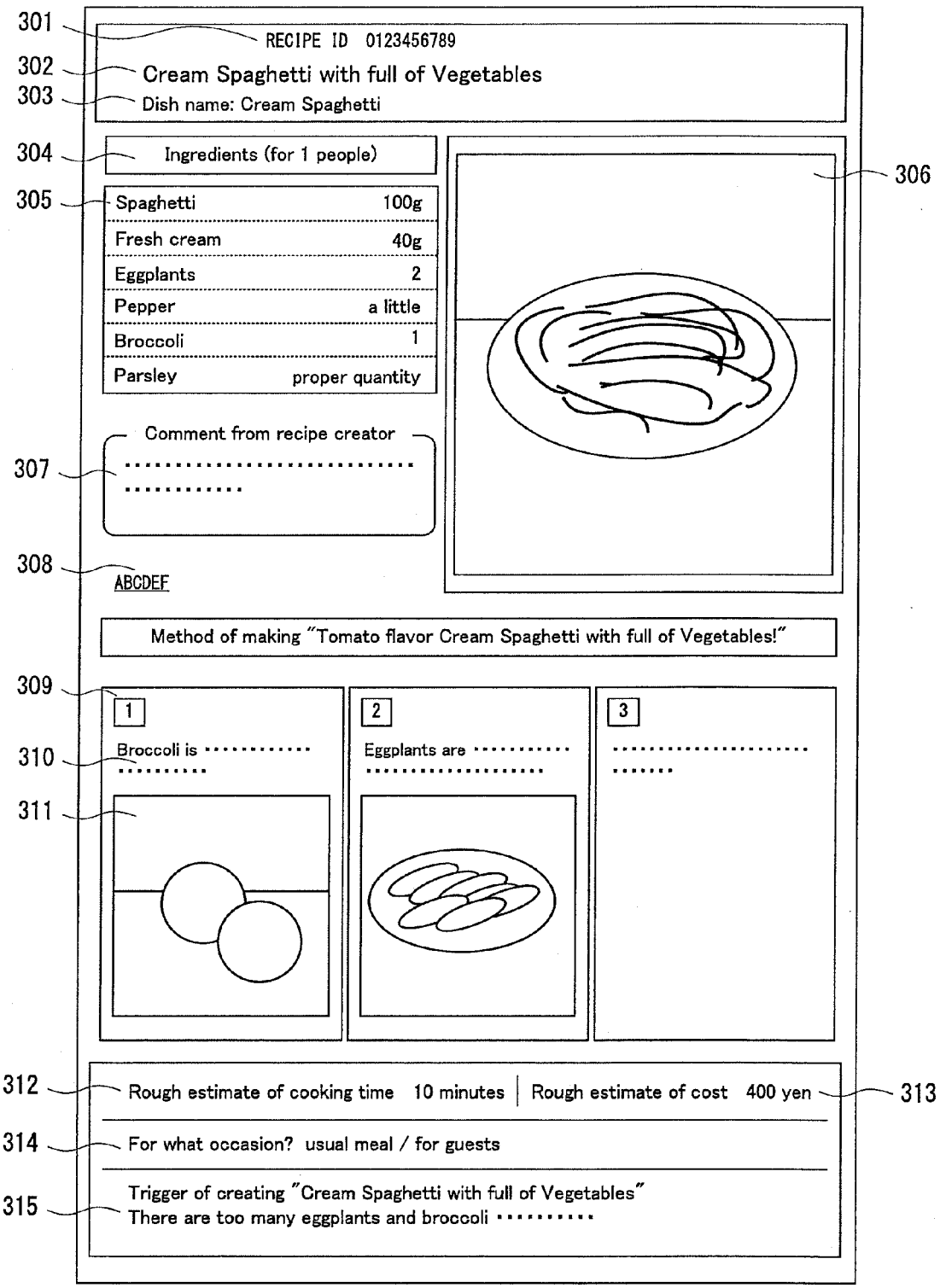
FIG. 8 is a diagram showing a screen display example of a recipe page for a PC 3.

FIG. 8 is a diagram showing a screen display example of the recipe page for the PC 3. As shown in FIG. 8, in the recipe page for the PC 3, a recipe ID 301, a recipe title 302, a dish name 303, the number of target people 304, ingredient names and amounts of ingredients 305, a main image 306, a comment 307, a nickname 308, a plurality of process display fields 309, a cooking time 312, an ingredient cost 313, a use 314, and a trigger text 315 are displayed. In each process display field 309, a process text 310 and a process image 311 are displayed.

FIG. 9A is a diagram showing a screen display example of the recipe page for the mobile phone 2. The recipe page shown in FIG. 9A is displayed on the mobile phone 2. Specifically, in the recipe page for the mobile phone 2, a recipe title 401, a main image 402, a nickname 403, a comment 404, the number of target people 405, ingredient names and amounts of ingredients 406, a plurality of process texts 407, a trigger text 409, a cooking time 410, an ingredient cost 411, a use 412, a recipe ID 413, and the like are displayed.

The process image is not displayed in the recipe page for the mobile phone 2. Instead of the process image, a process display link 408 is displayed following each process text 407. When the user selects one of the process display links 408, the process page is displayed on the screen of the mobile phone 2.

FIG. 9B is a screen display example of the process page. As shown in FIG. 9B, in the process page, a process text 501 and a process image 502 corresponding to the selected process display link 408 are displayed. In this way, the recipe server 1 may generate a plurality of HTML documents of Web pages, each of which includes a part of the recipe information, so that the entire recipe information is displayed by a plurality of Web pages.

[3-2. Operation of Recipe Server]

Figure 10:
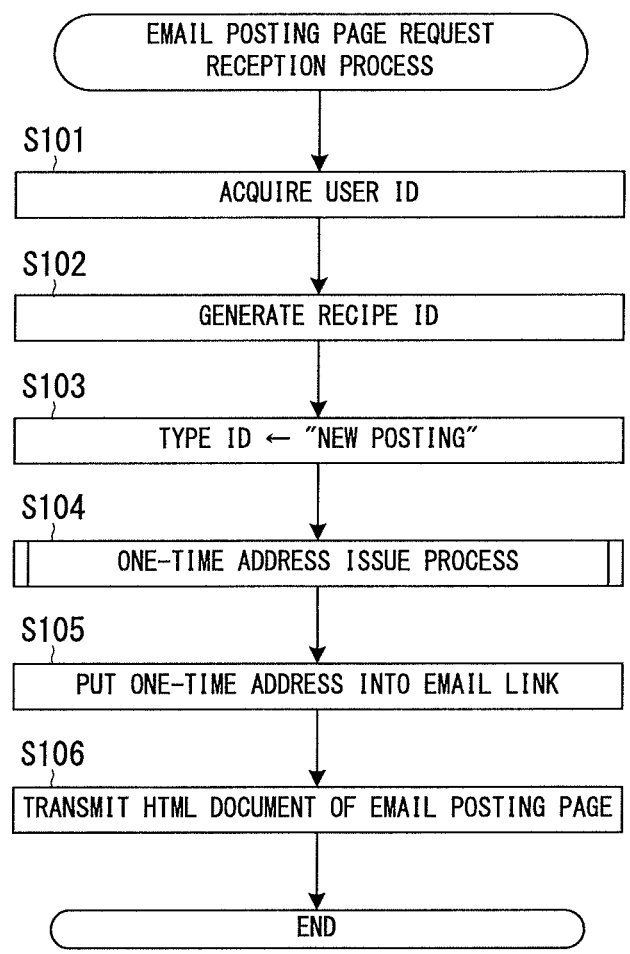
FIG. 10 is a flowchart showing a process example of an email posting page request reception process of a system control unit 14 of the recipe server 1 according to the embodiment.

FIG. 10 is a flowchart showing a process example of an email posting page request reception process of the system control unit 14 of the recipe server 1 according to the present embodiment. The email posting page request reception process is started when the system control unit 14, which works as the request reception means, receives a request of the email posting page from the mobile phone 2.

As shown in FIG. 10, the system control unit 14 acquires the user ID of the user who uses the mobile phone 2 that transmits the request (step S101). The method of acquiring the user ID has already been described. Next, the system control unit 14 generates a new recipe ID (step S102). Next, the system control unit 14 sets the type ID to "new posting" (step S103).

Next, the system control unit 14 performs a one-time address issue process described later (step S104). At this time, the system control unit 14 specifies the acquired user ID, the generated recipe ID, and the type ID indicating the "new posting" as arguments of the one-time address issue process. In the one-time address issue process, a new one-time address is generated. Also, in the one-time address issue process, management information is registered in which the user ID, the recipe ID, and the type ID that are specified as the arguments are included.

Next, the system control unit 14 acquires an HTML document for the email posting page from the storage unit 12. The system control unit 14 sets the one-time address generated in the one-time address issue process into the href attribute of the "a" tag of an email link included in the acquired HTML document (step S105). Next, as the first transmission means, the system control unit 14 transmits the HTML document in which the one-time address is put to the mobile phone 2 that is the transmission source of the request of the email posting page (step S106). When the system control unit 14 completes the process of step S106, the system control unit 14 ends the email posting page request reception process.

Figure 11:
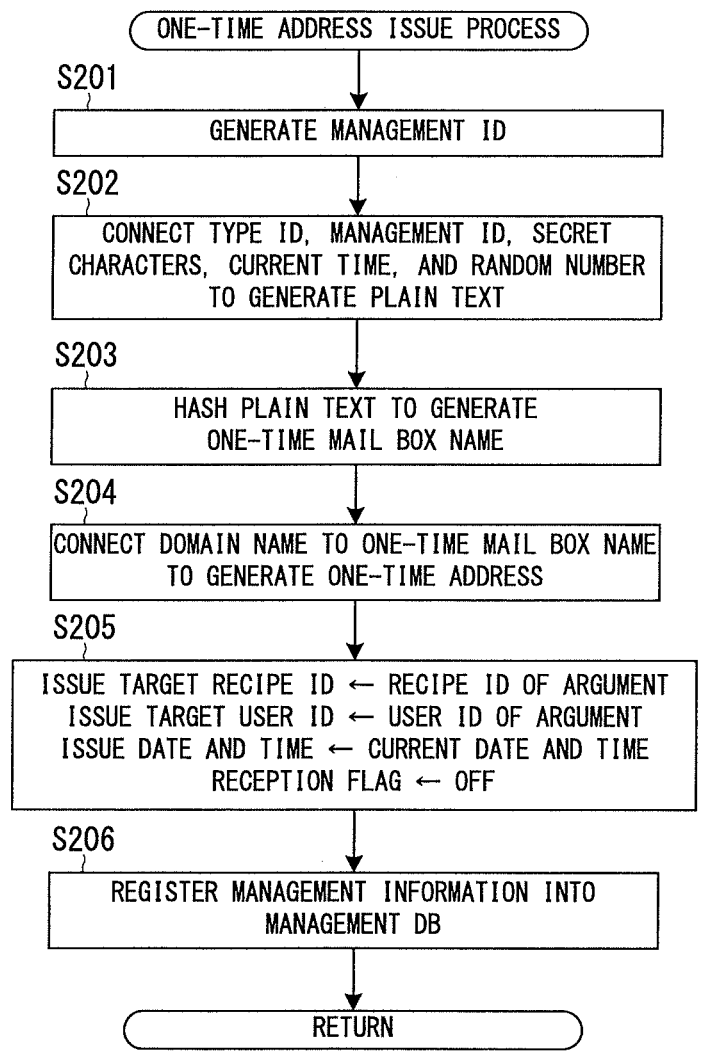
FIG. 11 is a flowchart showing a process example of a one-time address issue process of the system control unit 14 of the recipe server 1 according to the embodiment.

FIG. 11 is a flowchart showing a process example of the one-time address issue process of the system control unit 14 of the recipe server 1 according to the present embodiment.

As shown in FIG. 11, as the first address generation means or the second address generation means, the system control unit 14 generates a one-time address unique for each issue.

First, as the identification information generation means, the system control unit 14 generates a new management ID (step S201). Next, the system control unit 14 generates a plain text to be hashed (step S202). Specifically, the system control unit 14 acquires secret characters stored in the storage unit 12. The secret characters are, for example, a text set in advance by a system administrator or the like. The secret characters are managed so as not to be leaked to the outside of the recipe site. The system control unit 14 acquires the current time. The system control unit 14 generates a pseudo-random number. Then, the system control unit 14 connects the type ID specified as an argument, the newly generated management ID, the secret characters, the current time, and the pseudo-random number to generate the plain text.

Next, the system control unit 14 hashes the generated plain text by using a hash function stored in the storage unit 12. Thereby, the system control unit 14 generates a one-time mail box name (step S203).

As described above, the management ID is identification information unique for each generated one-time address. Therefore, the one-time mail box name is generated so as not to be the same as those that have already been generated. Therefore, in order to generate a one-time mail box name so as not to be the same as those that have already been generated, the recipe ID and the user ID need not be included in the plain text. Therefore, for example, even if a malicious person finds out the original plain text from an obtained one-time mail box name, the malicious person cannot identify the target recipe information and the user who posts the recipe information. Thereby, it is possible to ensure security. For example, it is possible to make it difficult for a malicious person to counterfeit a one-time mail box name in order to successfully pretend to be a certain user and post recipe information or add information to certain recipe information.

Next, the system control unit 14 connects a domain name for posting the recipe information to the generated one-time mail box name to generate a one-time address (step S204).

Next, the system control unit 14 performs a setting process of the management information to be registered in the management information DB 12c (step S205). Specifically, the system control unit 14 sets the issue target user ID and the issue target recipe ID to the user ID and the recipe ID, which are specified as arguments. The system control unit 14 acquires the current date and time and sets the issue date and time to the current date and time. The system control unit 14 sets the reception flag to OFF. The system control unit 14 also puts the generated management ID, the type ID specified as an argument, and the generated one-time mail box name into the management information.

Next, the system control unit 14 registers the management information, where the setting process is completed, into the management information DB 12c (step S206). In this way, as the first control means or the second control means, the system control unit 14 stores the one-time mail box name of the generated one-time address, the type ID indicating whether the generated one-time address is a one-time address corresponding to the "new posting" or a one-time address corresponding to the "add process," and the recipe ID into the storage unit 12 in association with each other. Here, when the type ID is the "add process," the recipe ID to be stored is a recipe ID of recipe information registered when the receiver address included in the received posting email is discriminated as the one-time address corresponding to the "new posting" or a recipe ID of recipe information where a process image is added when the receiver address included in the received posting email is discriminated as the one-time address corresponding to the "add process." When the system control unit 14 completes the process of step S206, the system control unit 14 ends the one-time address issue process.

Figure 12:
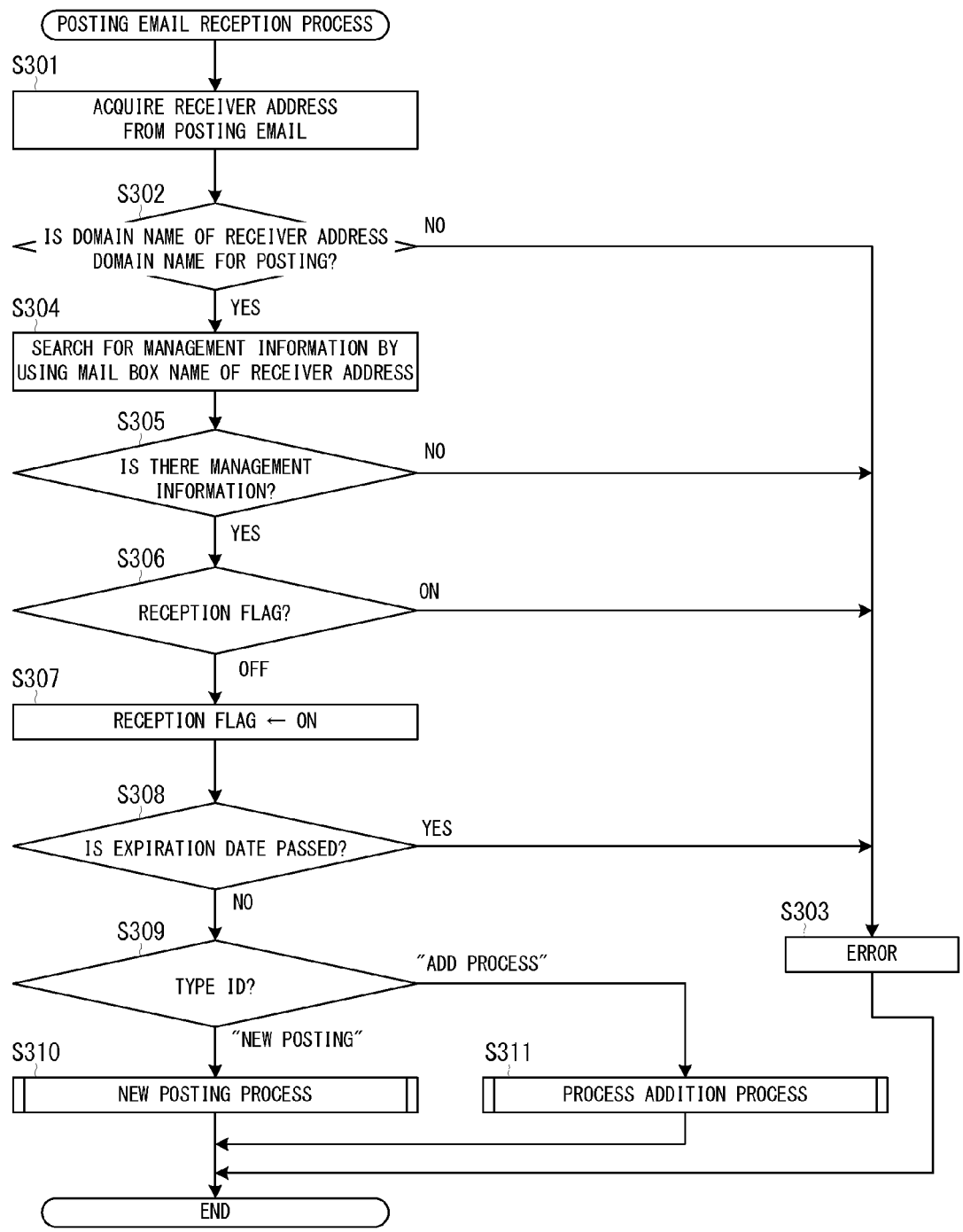
FIG. 12 is a flowchart showing a process example of a posting email reception process of the system control unit 14 of the recipe server 1 according to the embodiment.

FIG. 12 is a flowchart showing a process example of a posting email reception process of the system control unit 14 of the recipe server 1 according to the present embodiment. The posting email reception process is started when the system control unit 14, which works as the reception means, receives a posting email.

As shown in FIG. 12, the system control unit 14 acquires the receiver address from the received posting email (step S301). Then, as the discrimination means, the system control unit 14 discriminates the receiver address.

First, the system control unit 14 determines whether or not the domain name included in the receiver address is the domain name for posting the recipe information (step S302). At this time, if the system control unit 14 determines that the domain name is not the domain name for posting the recipe information (step S302: NO), the system control unit 14 determines that an error occurs (step S303). In other words, the system control unit 14 discriminates that the receiver address is not the one-time address generated by the system control unit 14. Then, the system control unit 14 ends the posting email reception process. In other words, the system control unit 14 rejects the posting by the received posting email.

On the other hand, when the system control unit 14 determines that the domain name is the domain name for posting the recipe information (step S302: YES), the system control unit 14 searches for management information, which includes the same mail box name as that included in the acquired receiver address, from the management information DB 12c (step S304). Next, the system control unit 14 determines whether or not the management information is detected (step S305). In other words, the system control unit 14 determines whether or not the same mail box name as that included in the acquired receiver address is registered in the management information DB 12c. At this time, if the system control unit 14 determines that the management information is not detected (step S305: NO), the system control unit 14 determines that an error occurs (step S303). In other words, the system control unit 14 discriminates that the receiver address is not the one-time address generated by the system control unit 14.

On the other hand, when it is determined that the management information is detected (step S305: YES), the receiver address is the one-time address generated by the system control unit 14. In this case, as the determination means and the second determination means, the system control unit 14 determines content of the reception flag put in the detected management information (step S306). At this time, if the system control unit 14 determines that the reception flag is set to ON (step S306: ON), the system control unit 14 determines that an error occurs. In this case, the one-time address acquired from the received posting email has been used once before. In other words, the system control unit 14 has already received a posting email where the same one-time address as the acquired one-time address is included as the receiver address. Therefore, the system control unit 14 rejects the posting by the received posting email.

On the other hand, if the system control unit 14 determines that the reception flag is set to OFF (step S306: OFF), the system control unit 14 changes the reception flag to ON (step S307). Next, the system control unit 14 determines whether or not the expiration date and time of the one-time address is passed (step S308). Specifically, the system control unit 14 acquires the current date and time. Next, the system control unit 14 calculates an elapsed time from the issue date and time by subtracting the issue date and time put in the detected management information from the current date and time. Then, the system control unit 14 determines whether or not the calculated elapsed time is longer than a threshold time pre-stored in the storage unit 12. In other words, as the time determination means, the system control unit 14 determines whether or not the posting email including the one-time address included in the posting completion email is received after the threshold time has elapsed since the posting completion email was transmitted. The threshold time indicates the length of the period of time in which the one-time address is valid. The threshold time is an example of a preset time in the present invention.

At this time, if the system control unit 14 determines that the elapsed time is longer than the threshold time, the system control unit 14 determines that the expiration date and time of the one-time address is passed (step S308: YES). In this case, the system control unit 14 determines that an error occurs (step S303).

On the other hand, if the system control unit 14 determines that the elapsed time is not longer than the threshold time, the system control unit 14 determines that the expiration date and time of the one-time address is not passed (step S308: NO). In other words, when the system control unit 14 determines that the posting email including the one-time address included in the posting completion email is received before the threshold time has elapsed since the posting completion email was transmitted, the system control unit 14 determines that the expiration date and time of the one-time address is not passed. In this case, the system control unit 14 determines that the one-time address is valid. Next, the system control unit 14 determines content of the type ID put in the detected management information (step S309). At this time, if the system control unit 14 determines that the type ID indicates "new posting" (step S309: new posting), the system control unit 14 discriminates that the receiver address is a one-time address used for a new registration. In this case, the system control unit 14 performs a new posting process described later (step S310). At this time, the system control unit 14 specifies the detected management information as an argument. In the new posting process, information included in the received posting email is newly registered as the recipe information on the basis of the management information specified as an argument.

On the other hand, if the system control unit 14 determines that the type ID indicates "add process" (step S309: add process), the system control unit 14 discriminates that the receiver address is a one-time address used to add information to recipe information that has already been registered. In this case, the system control unit 14 performs a process addition process described later (step S311). At this time, the system control unit 14 specifies the detected management information as an argument. In the process addition process, information included in the received posting email is added to recipe information that has already been registered on the basis of the management information specified as an argument.

When the system control unit 14 completes the process of step S310 or S311, the system control unit 14 ends the posting email reception process. When the system control unit 14 determines that an error occurs in step S303, the system control unit 14 may transmit an email which notifies of the error and is addressed to the sender of the posting email.

FIG. 13 is a flowchart showing a process example of the new posting process of the system control unit 14 of the recipe server 1 according to the present embodiment.

As shown in FIG. 13, the system control unit 14 determines whether or not the user ID put in the management information specified as an argument is valid (step S401). Specifically, the system control unit 14 determines whether or not member information corresponding to the user ID put in the management information is registered in the member information DB 12*a*. The member information corresponding to the user ID put in the management information is member information that includes the same user ID as that put in the management information. At this time, if the system control unit 14 determines that the member information corresponding to the user ID put in the management information is not registered, the system control unit 14 determines that the user ID is invalid (step S401: NO). In this case, the system control unit 14 determines that an error occurs (step S402). This is because, in this case, the user corresponding to the user ID has withdrawn from the recipe site. Then, the system control unit 14 ends the new posting process. In other words, the system control unit 14 rejects the posting by the received posting email.

On the other hand, when the system control unit 14 determines that the member information corresponding to the user ID put in the management information is registered, the system control unit 14 determines that the user ID is valid (step S401: YES). In this case, the system control unit 14 determines whether or not the main body of the received posting email is a main body formed from multiple parts (step S403). At this time, if the system control unit 14 determines that the main body of the received posting email is formed from a single part (step S403: NO), the system control unit 14 determines that an error occurs (step S402). In this case, an image to be the main image is not attached to the posting email. Therefore, the system control unit 14 rejects the posting by the posting email to which no main image is attached.

On the other hand, if the system control unit 14 determines that the main body of the received posting email is a main body formed from multiple parts (step S403: YES), the system control unit 14 selects one of the parts included in the main body (step S404). When the main body of the posting email is formed from multiple parts, each part included in the posting email is, for example, a body text of a message of the posting email, an attached image, or the like. Next, the system control unit 14 determines whether or not the selected part is the body text (step S405). At this time, if the system control unit 14 determines that the selected part is the body text (step S405: YES), the system control unit 14 acquires a text of the body text from the selected part and stores the text in a predetermined area in the RAM 14*c* (step S406). Next, the system control unit 14 proceeds to step S410.

On the other hand, if the system control unit 14 determines that the selected part is not the body text (step S405: NO), the system control unit 14 determines whether or not the selected part is an attached image (step S407). At this time, if the system control unit 14 determines that the selected part is not an attached image (step S407: NO), the system control unit 14 proceeds to step S410.

On the other hand, if the system control unit 14 determines that the selected part is an attached image (step S407: YES), the system control unit 14 determines whether or not the attached image satisfies a condition to be registered (step S408). For example, the system control unit 14 determines whether or not the format, the display size, the data size, and the like of the attached image satisfy predetermined conditions respectively. At this time, if the system control unit 14 determines that the attached image satisfies the conditions (step S408: YES), the system control unit 14 acquires the attached image from the selected part and stores the image in a predetermined area in the RAM 14*c* (step S409). Next, the system control unit 14 proceeds to step S410.

On the other hand, if the system control unit 14 determines that the attached image does not satisfy the conditions (step S408: NO), the system control unit 14 ignores the attached image of the selected part and proceeds to step S410.

In step S410, the system control unit 14 determines whether or not there are one or more parts that have not yet been selected among the parts included in the main body. At this time, if the system control unit 14 determines that there is one or more parts that have not yet been selected (step S410: YES), the system control unit 14 selects one of the one or more parts that have not yet been selected (step S411). Next, the system control unit 14 proceeds to step S405. The system control unit 14 repeats the process from step S405 to step S411, so that the system control unit 14 stores the body text and the attached image included in the main body of the received posting email in the RAM 14*c*. If a plurality of attached images are included in the main body of the posting email, the system control unit 14 stores one of the attached images in the RAM 14*c*. In this case, the system control unit 14 may store the first attached image in the RAM 14*c* or may store the last attached image in the RAM 14*c*.

If the system control unit 14 determines that all the parts have been selected (step S410: NO), the system control unit 14 determines whether or not there is an attached image that satisfies the conditions in the main body of the received posting email (step S412). At this time, if the system control unit 14 determines that there is no attached image that satisfies the conditions (step S412: NO), the system control unit 14 determines that an error occurs (step S402).

On the other hand, if the system control unit 14 determines that there is an attached image that satisfies the conditions (step S412: YES), the system control unit 14 determines whether or not the text put in the subject of the received posting email and the text of the body text stored in the RAM 14*c* satisfy conditions to be registered respectively (step S413). For example, the system control unit 14 determines whether or not the lengths of the texts are within predetermined ranges respectively. At this time, if the system control unit 14 determines that the text put in the subject and the text of the body text stored in the RAM 14*c* do not satisfy the conditions (step S413: NO), the system control unit 14 determines that an error occurs (step S402).

On the other hand, if the system control unit 14 determines that the text put in the subject and the text of the body text stored in the RAM 14*c* satisfy the conditions (step S413: YES), the system control unit 14 performs a setting process of the recipe information to be registered in the recipe information DB 12*b* (step S414). Specifically, the system control unit 14 sets the recipe ID and the posting person user ID to the issue target recipe ID and the issue target user ID put in the management information specified as an argument. The system control unit 14 sets a text of the recipe title to the text put in the subject. The system control unit 14 sets the main image to the attached image stored in the RAM 14c. The system control unit 14 sets a text of the trigger text to the text of the body text stored in the RAM 14c. The system control unit 14 sets the publication flag to OFF. The system control unit 14 sets the number of processes in the process information to 0.

Next, as the registration means, the system control unit 14 registers the recipe information, where the setting process is completed, into the recipe information DB 12b (step S415).

Next, the system control unit 14 sets the type ID to "add process" (step S416). Next, the system control unit 14 performs the one-time address issue process (step S417). At this time, the system control unit 14 specifies the user ID and the recipe ID put in the management information specified as an argument as arguments of the one-time address issue process. Also, the system control unit 14 specifies the type ID, which indicates the "add process," as an argument.

Next, the system control unit 14 generates a posting completion email whose body text includes a one-time address generated in the one-time address issue process (step S418). At this time, the system control unit 14 sets the receiver address of the posting completion email to the sender address of the received posting email. Next, as the second transmission means, the system control unit 14 transmits the generated posting completion email (step S419). In this way, every time the recipe information is registered, the system control unit 14 transmits a posting completion email including a one-time address which corresponds to the registered recipe information and also corresponds to the "add process" to the sender of the received posting email.

When the system control unit 14 completes the process of step S419, the system control unit 14 ends the new posting process. When the system control unit 14 determines that an error occurs in step S402, the system control unit 14 may transmit an email which notifies of the error and is addressed to the sender of the posting email. In the posting email reception process, the system control unit 14 sets the reception flag of the management information to ON (step S307 in FIG. 12). However, the system control unit 14 may set the reception flag to OFF when the main body of the posting email is a single part, when there is no attached image that satisfies the conditions, or when the subject or the body text does not satisfy the conditions. In other words, when an error occurs which can be avoided if the user attaches an image that satisfies the conditions or inputs a subject or a body text that satisfies the conditions, it may be possible to re-transmit a posting email in which the same one-time address is put as the receiver address.

FIG. 14 is a flowchart showing a process example of the process addition process of the system control unit 14 of the recipe server 1 according to the present embodiment.

As shown in FIG. 14, the system control unit 14 determines whether or not the user ID put in the management information specified as an argument is valid (step S501). This determination method is the same as the process of the step S401 shown in FIG. 13. At this time, if the system control unit 14 determines that the user ID is invalid (step S501: NO), the system control unit 14 determines that an error occurs (step S502). Then, the system control unit 14 ends the process addition process. In other words, the system control unit 14 rejects the posting by the received posting email.

On the other hand, if the system control unit 14 determines that the user ID is valid (step S501: YES), the system control unit 14 determines whether or not the recipe ID put in the management information specified as an argument is valid (step S503). Specifically, the system control unit 14 determines whether or not the recipe information corresponding to the recipe ID put in the management information is registered in the recipe information DB 12b. The recipe information corresponding to the recipe ID put in the management information is recipe information that includes the same recipe ID as that put in the management information. Hereinafter, the recipe information corresponding to the recipe ID put in the management information is referred to as "corresponding recipe information."

If the system control unit 14 determines that the corresponding recipe information is not registered, the system control unit 14 determines that the recipe ID is invalid (step S503: NO). In this case, the system control unit 14 determines that an error occurs (step S502). This is because, in this case, the recipe information corresponding to the recipe ID is deleted by an operation of the user.

On the other hand, when the system control unit 14 determines that the corresponding recipe information is registered, the system control unit 14 determines that the recipe ID is valid (step S503: YES). In this case, the system control unit 14 determines content of the publication flag put in the corresponding recipe information (step S504). At this time, if the system control unit 14 determines that the publication flag is set to ON (step S504: ON), the system control unit 14 determines that an error occurs (step S502). In other words, the system control unit 14 allows adding a process image by a posting email only to recipe information in a draft state.

On the other hand, if the system control unit 14 determines that the publication flag is set to OFF (step S504: OFF), the system control unit 14 acquires the number of processes N put in the corresponding recipe information. Then, the system control unit 14 determines whether or not the number of processes N is smaller than the maximum number of processes that can be registered (step S505). At this time, if the system control unit 14 determines that the number of processes N is not smaller than the maximum number (step S505: NO), the system control unit 14 determines that an error occurs (step S502).

On the other hand, if the system control unit 14 determines that the number of processes N is smaller than the maximum number (step S505: YES), the system control unit 14 determines whether or not the main body of the received posting email is a main body formed from multiple parts (step S506). At this time, if the system control unit 14 determines that the main body of the received posting email is formed from a single part (step S506: NO), the system control unit 14 determines that an error occurs (step S502).

On the other hand, if the system control unit 14 determines that the main body of the received posting email is a main body formed from multiple parts (step S506: YES), the system control unit 14 selects one of the parts included in the main body (step S507). Next, the system control unit 14 determines whether or not the selected part is an attached image (step S508). At this time, if the system control unit 14 determines that the selected part is not an attached image (step S508: NO), the system control unit 14 proceeds to step S513.

On the other hand, if the system control unit 14 determines that the selected part is an attached image (step S508: YES), the system control unit 14 determines whether or not the attached image satisfies a condition to be registered (step S509). This determination content is the same as that of the step S408 shown in FIG. 13. At this time, if the system control unit 14 determines that the attached image does not satisfy the condition (step S509: NO), the system control unit 14 proceeds to step S513.

On the other hand, if the system control unit 14 determines that the attached image satisfies the condition (step S509: YES), the system control unit 14 adds the process image. Specifically, the system control unit 14 adds 1 to the number of processes N put in the corresponding recipe information (step S510). Next, the system control unit 14 acquires the attached image from the selected part. As the addition means, the system control unit 14 additionally registers the acquired attached image into the corresponding recipe information as a process image of a process N (step S511).

Next, the system control unit 14 determines whether or not the number of processes N is smaller than the maximum number (step S512). At this time, if the system control unit 14 determines that the number of processes N is smaller than the maximum number (step S512: YES), the system control unit 14 proceeds to step S513. On the other hand, if the system control unit 14 determines that the number of processes N is not smaller than the maximum number (step S512: NO), the system control unit 14 proceeds to step S515.

In step S513, the system control unit 14 determines whether or not there are one or more parts that have not yet been selected among the parts included in the main body. At this time, if the system control unit 14 determines that there is one or more parts that have not yet been selected (step S513: YES), the system control unit 14 selects one of the one or more parts that have not yet been selected (step S514). Next, the system control unit 14 proceeds to step S508. The system control unit 14 repeats the process from step S508 to step S514, so that the system control unit 14 sequentially adds the attached image included in the main body of the received posting email to the corresponding recipe information as a process image. When the system control unit 14 determines that all the parts have been selected (step S513: NO), the system control unit 14 proceeds to step S515.

In step S515, the system control unit 14 determines whether or not there is an attached image that satisfies the condition in the main body of the received posting email. At this time, if the system control unit 14 determines that there is no attached image that satisfies the condition (step S515: NO), the system control unit 14 determines that an error occurs (step S502).

On the other hand, if the system control unit 14 determines that there is an attached image that satisfies the condition (step S515: YES), the system control unit 14 generates a new one-time address and registers management information and then transmits a posting completion email whose body text includes the new one-time address (step S516 to step S519). The above process is the same as that of step S416 to step S419 shown in FIG. 13. In this way, every time all the process images included in the received posting email are added to the recipe information, the system control unit 14 transmits a posting completion email including a one-time address which corresponds to the recipe information to which the process images are added and which also corresponds to the "add process". The posting completion email is addressed to the sender of the received posting email.

When the system control unit 14 completes the process of step S519, the system control unit 14 ends the process addition process. When the system control unit 14 determines that an error occurs in step S502, the system control unit 14 may transmit an email which notifies of the error and which is addressed to the sender of the posting email. The system control unit 14 may set the reception flag to OFF when the main body of the posting email is a single part or when there is no attached image that satisfies the condition. In other words, it may be possible to re-transmit a posting email in which the same one-time address is put as the receiver address.

As described above, according to the present embodiment, the system control unit 14 receives a posting email, discriminates the receiver address included in the posting email, registers the recipe information including the main image and the like included in the posting email into the recipe information DB 12b when the receiver address is discriminated as a one-time address corresponding to "new posting," transmits a posting completion email which includes a one-time address corresponding to the "add process" corresponding to the registered recipe information and which is addressed to the sender of the posting email, determines whether or not the receiver address is the same as one of receiver addresses included in posting emails that have been received before, and adds process images included in the currently received posting email to the recipe information corresponding to the receiver address included in the posting email when the receiver address is discriminated as a one-time address corresponding to "add process" and the receiver address is determined not to be the same as any receiver address included in posting emails that have been received before.

When the receiver address is discriminated as a one-time address corresponding to "add process," the system control unit 14 determines whether or not the receiver address is the same as one of receiver addresses included in posting emails that have been received before, and when the receiver address is determined not to be the same as any receiver address included in the posting emails that have been received before, the system control unit 14 may add process images included in the currently received posting email to the recipe information corresponding to the receiver address included in the posting email.

Therefore, the user can post recipe information for each topic. Also, it is possible to make it difficult to add a process image to the recipe information by an email from a person other than a person who registered the recipe information.

When the receiver address is determined not to be the same as any receiver address included in posting emails that have been received before, the system control unit 14 transmits a posting completion email including a new one-time address corresponding to "add process."

Therefore, the user can add a process image to the recipe information one after another.

Every time the recipe information is registered, the system control unit 14 transmits a posting completion email including a one-time address which corresponds to the registered recipe information and which also corresponds to "add process" to the sender of the received posting email, and every time all the process images included in the received posting email are added to the recipe information, the system control unit 14 transmits a posting completion email including a one-time address which corresponds to the recipe information to which the process images are added and which also corresponds to "add process" to the sender of the received posting email.

The system control unit 14 determines whether or not the posting email including the one-time address included in the posting completion email is received before the threshold time has elapsed since the posting completion email was transmitted, and when the receiver address is discriminated as a one-time address corresponding to "add process," the receiver address is determined not to be the same as any receiver address included in posting emails that have been received before, and the posting email is determined to be received before the threshold time has elapsed, the system control unit 14 may add process images included in the currently received posting email to the recipe information.

The system control unit 14 receives the user ID from the mobile phone 2 and transmits a one-time address corresponding to "new posting" to the mobile phone 2 that has transmitted the user ID. When the receiver address of the posting email is discriminated as a one-time address corresponding to "new posting" and the receiver address is determined not to be the same as any receiver address included in posting emails that have been received before, the system control unit 14 registers the recipe information in association with the user ID corresponding to the receiver address included in the posting email.

When the receiver address of the posting email is discriminated as a one-time address corresponding to "new posting," the system control unit 14 determines whether the receiver address is the same as one of receiver addresses included in posting emails that have been received before, and when the receiver address is determined not to be the same as any receiver address included in the posting emails that have been received before, the system control unit 14 may register the recipe information in association with the user ID corresponding to the receiver address included in the posting email.

Therefore, it is possible to make it difficult for a person other than the user to successfully pretend to be the user and register recipe information.

The system control unit 14 receives a request of the email posting page from the mobile phone 2. Every time the system control unit 14 receives a request of the email posting page, the system control unit 14 generates a one-time address corresponding to "new posting," stores a one-time mail box name included in the generated one-time address and the type ID, which is set to "new posting", into the storage unit 12 in association with each other, and transmits a posting completion email including the generated one-time address. Every time the recipe information is registered, the system control unit 14 generates a one-time address corresponding to "add process," and every time all the process images included in the received posting email are added to the recipe information, the system control unit 14 generates a one-time address corresponding to "add process." At the above times, the system control unit 14 stores a one-time mail box name included in the generated one-time address, the type ID which is set to "add process", and the recipe ID of either the registered recipe information or the recipe information where the process image is added into the storage unit 12 in association with each other, and transmits a posting completion email including the generated one-time address. The system control unit 14 discriminates the receiver address on the basis of the receiver address included in the currently received posting email and the one-time mail box name and the type ID which are stored in the storage unit 12 in association with each other.

When the receiver address included in the posting email is discriminated as a one-time address corresponding to "new posting," the system control unit 14 registers the recipe information including the main image and the like included in the posting email in association with the recipe ID. The system control unit 14 generates a management ID, generates a one-time mail box name based on the management ID, generates a one-time address including the one-time mail box name, and registers the generated management ID, the generated one-time mail box name, and the recipe ID of the corresponding recipe information into the management information DB 12c in association with each other. When the same one-time mail box name as the mail box name of the receiver address of the received posting email is registered in the management information DB 12c, the system control unit 14 discriminates that the receiver address is the one-time address and adds the process image to the recipe information corresponding to the recipe ID corresponding to the one-time mail box name of the receiver address included in the posting email.

Therefore, it is possible to prevent a one-time address from being fraudulently generated by a person who intends to add a process image to certain recipe information.

In the embodiment described above, the mobile terminal apparatus of the present invention is applied to the mobile phone. However, the mobile terminal apparatus may be applied to, for example, a smartphone, a PDA (Personal Digital Assistant), and the like.

In the embodiment described above, when the user accesses an email posting page by the mobile phone 2, the user can acquire a one-time address. However, when the user accesses a predetermined Web page for issuing a one-time address by the PC 3, the user may be able to acquire a one-time address. Specifically, the user accesses the Web page for issuing a one-time address while the user is logged in to the recipe site by operating the PC 3. Then, the user inputs an email address of the mobile phone 2, to which the one-time address will be transmitted, on the Web page for issuing a one-time address. The inputted email address is transmitted from the PC 3 and received by the recipe server 1. Then, the recipe server 1 sets he receiver address to the inputted email address and transmits an email including the one-time address. In other words, the recipe server 1 transmits an email including a one-time address corresponding to "new posting" to a user identified by a user ID received from the PC 3 when the user logs in to the recipe server 1. The email address of the mobile phone 2 transmitted from the PC 3 to the recipe server 1 is an example of a request of the first address of the present invention. Or, when the Web page for issuing a one-time address is accessed, the recipe server 1 may acquire the email address of the mobile phone 2 from the member information of the user. The recipe server 1 may set the receiver address to the acquired email address and transmit an email including the one-time address.

In the embodiment described above, the one-time address is put in the body text of the posting completion email. However, for example, the one-time address may be put in the From field or the Reply-To field of the posting completion email. In this case, the user can set the receiver address of the posting email to the one-time address by selecting reply to the received posting completion email. In this case, the body text of the posting completion email may include a message indicating that posting can be made by reply.

In the embodiment described above, the recipe ID and the user ID are not included in a plain text which is a source of the one-time mail box name. However, at least either one of the recipe ID or the user ID may be included in the plain text. The one-time mail box name may be generated by encrypting the plain text.

A part of characters of the domain name of the one-time address may be generated by hashing or encrypting the plain text. In this case, the one-time address may be generated in a range of domain names where the recipe server 1 can receive an email.

In the embodiment described above, among information of components of the Web page, the recipe title, the main image, the comment, and the process image can be registered by an email. However, information other than the above may be able to be registered by an email. For example, as a body text of the posting email for adding a process image to the recipe information, a process text may be able to be described. In this case, the recipe server 1 acquires an attached image as the process image from the received posting email and also acquires the body text as the process text. Then, the recipe server 1 associates the process image and the process text acquired from the posting email with each other and adds the process image and the process text to the recipe information as new process information. Attaching an image to an email need not be a requirement to generate recipe information or add information to the recipe information.

The type of information that can be registered by an email is not limited to text and static image. For example, a moving image, voice information, and the like may be able to be registered by an email.

In the embodiment described above, the present invention is applied to a system that generates a Web page displaying recipe information as a topic published on the Web page. However, the present invention may be applied to a system that generates a Web page displaying information of a topic other than recipe. For example, the topic may be an item for sale exhibited on net auction and an article of a blog. For example, the present invention may be applied to a system that generates a Web page displaying information of an item for sale, a system that generates a Web page displaying an article of a blog, and the like. For example, on a Web page displaying an article of a blog, a plurality of articles may be displayed on one Web page. In this manner, a Web page may be generated so that information of a plurality of topics is displayed on one Web page.

In the embodiment described above, the first address of the present invention is applied to the one-time address. In other words, a unique email address is issued for each issue. However, an email address common to all users may be defined as the first address. An example of a system that uses such a first address is a system where a user who transmits an email need not be strictly identified.

In this case, a user X sets the receiver address to a common first address and transmits an email. When the receiver address of a received email is the first address, an information registration apparatus newly registers generation information used to generate a Web page by information included in the email. At this time, the information registration apparatus associates the generation information with identification information of the generation information. However, the information registration apparatus does not associate the generation information with identification information of the user. Next, the information registration apparatus generates a second address as a one-time address and stores the generated second address and the identification information of the registered generation information in association with each other. Then, the information registration apparatus transmits an email including the generated second address to the user X. The email address of the user X can be acquired from the From field of the email received by the information registration apparatus.

The user X sets the receiver address to the second address included in the received email and transmits a second email. The second address is associated with the generation information registered by the first email from the user X. Therefore, information included in the second email is added to the generation information including the information included in the first email from the user X. In this way, when the information registration apparatus receives an email from the user who registered the generation information by the first email, the information registration apparatus can add information to the generation information. In the same manner as in the above-described embodiment, it is possible to make it difficult for a person other than a person who registered the generation information by the first email to add information to the generation information by an email.

The number of times to be able to add information to the registered generation information by an email may be set in advance. For example, the number of times may be only one.

As a terminal apparatus which makes it possible to transmit information to be a component of a Web page by an email, a mobile terminal apparatus having a relatively large screen size, such as a notebook personal computer and a tablet type computer may be applied. A stationary type terminal apparatus such as a desktop personal computer and a set-top box may also be applied. In this case, for example, the user can register a certain amount of information in advance at an arbitrary timing by using an email before fully performing a registration operation on a registration screen for inputting various information to be displayed on the Web page.

REFERENCE SIGNS LIST

1 Recipe server
2, 2-1 Mobile phone
3, 3-1, 3-2 PC
11 Communication unit
12 Storage unit
12a Member information DB
12b Recipe information DB
12c Management information DB
13 Input/output interface
14 System control unit
14a CPU
14b ROM
14c RAM
15 System bus
NW Network
S Recipe information providing system

The invention claimed is:

1. An information registration apparatus for registering, for each web page, generation information including element information to be components of a Web page on the basis of an email transmitted from a terminal apparatus, the information registration apparatus comprising:
at least one memory operable to store program code;
at least one hardware processor operable to access said memory and read said program code and operate as instructed by said program code, said program code including:
reception code configured to cause at least one of said at least one hardware processor to receive an email;
discrimination code configured to cause at least one of said at least one hardware processor to discriminate a receiver address being an email address included in the currently received email, the email address indicating a receiver;
registration code configured to cause at least one of said at least one hardware processor to register the generation information included in the currently received email when the receiver address is discriminated as a first address for registering the generation information;
second transmission code configured to cause at least one of said at least one hardware processor to transmit, every time the generation information is registered by the registration code, an email addressed to a sender of the currently received email, the transmitted email including a second address, the second address corresponding to the registered generation information, the second address being unique for each transmission, the second address being used to add the element information to the generation information;

determination code configured to cause at least one of said at least one hardware processor to determine whether or not the receiver address included in the currently received email is the same as a receiver address included in an email received earlier; and addition code configured to cause at least one of said at least one hardware processor to add the element information included in the currently received email to the generation information corresponding to the receiver address included in the currently received email when the receiver address included in the currently received email is discriminated as the second address included in the email transmitted by the second transmission code and the receiver address included in the currently received email is determined not to be the same as the receiver address included in the earlier received email, wherein every time the element information included in the currently received email is added by the addition code, the second transmission code is further configured to cause at least one of said at least one hardware processor to transmit another email, which is addressed to the sender of the currently received email, including the new second address corresponding to the generation information to which the element information is added.

2. The information registration apparatus according to claim 1, wherein the second transmission code is further configured to cause at least one of said at least one hardware processor to transmit an email including the new second address corresponding to the generation information to which the element information is added by the addition unit.

3. The information registration apparatus according to claim 2, wherein there is the generation information corresponding to a Web page for each Web page, and every time the generation information is registered, the second transmission code is further configured to cause at least one of said at least one hardware processor to transmit the email, which is addressed to the sender of the received email, including the second address corresponding to the registered generation information, and every time all the element information included in the received email are added by the addition unit, the second transmission code is further configured to cause at least one of said at least one hardware processor to transmit the email, which is addressed to the sender of the received email, including the new second address corresponding to the generation information to which the element information is added.

4. The information registration apparatus according to claim 2, wherein said program code further includes:

time determination code configured to cause at least one of said at least one hardware processor to determine whether or not the email including the second address is received by the reception unit within a predetermined time from when the email including the second address is transmitted, wherein the addition code is further configured to cause at least one of said at least one hardware processor to add the element information included in the currently received email when the receiver address is discriminated as the second address, the receiver address is determined not to be the same as the receiver address included in an email having been received before, and the email including the second address is determined to be received within the time.

5. The information registration apparatus according to claim 2, wherein said program code further includes:

user identification information reception code configured to cause at least one of said at least one hardware processor to receive user identification information for identifying a user from a terminal apparatus; and first transmission code configured to cause at least one of said at least one hardware processor to transmit the first address to the terminal apparatus having transmitted the user identification information or transmits an email addressed to a user identified by the user identification information, the email transmitted by the first transmission unit including the first address, the first address being unique for each transmission, the first address corresponding to the received user identification information, wherein, when the receiver address is discriminated as the first address and the receiver address is determined not to be the same as the receiver address included in an email having been received before, the registration code is further configured to cause at least one of said at least one hardware processor to register the generation information in association with the user identification information corresponding to the receiver address included in the currently received email.

6. The information registration apparatus according to claim 3, wherein said program code further includes:

time determination code configured to cause at least one of said at least one hardware processor to determine whether or not the email including the second address is received by the reception unit within a predetermined time from when the email including the second address is transmitted, wherein the addition code is further configured to cause at least one of said at least one hardware processor to add the element information included in the currently received email when the receiver address is discriminated as the second address, the receiver address is determined not to be the same as the receiver address included in an email having been received before, and the email including the second address is determined to be received within the time.

7. The information registration apparatus according to claim 3, wherein said program code further includes:

user identification information reception code configured to cause at least one of said at least one hardware processor to receive user identification information for identifying a user from a terminal apparatus; and first transmission code configured to cause at least one of said at least one hardware processor to transmit the first address to the terminal apparatus having transmitted the user identification information or transmits an email addressed to a user identified by the user identification information, the email transmitted by the first transmission unit including the first address, the first address being unique for each transmission, the first address corresponding to the received user identification information, wherein, when the receiver address is discriminated as the first address and the receiver address is determined not to be the same as the receiver address included in an email having been received before, the registration code is further configured to cause at least one of said at least one hardware processor to register the generation information in association with the user identification information corresponding to the receiver address included in the currently received email.

8. The information registration apparatus according to claim 1, wherein said program code further includes:
   time determination code configured to cause at least one of said at least one hardware processor to determine whether or not the email including the second address is received within a predetermined time from when the email including the second address is transmitted,
   wherein the addition code is further configured to cause at least one of said at least one hardware processor to add the element information included in the currently received email when the receiver address is discriminated as the second address, the receiver address is determined not to be the same as the receiver address included in an email having been received before, and the email including the second address is determined to be received within the time.

9. The information registration apparatus according to claim 8, wherein said program code further includes:
   user identification information reception code configured to cause at least one of said at least one hardware processor to receive user identification information for identifying a user from a terminal apparatus; and
   first transmission code configured to cause at least one of said at least one hardware processor to transmit the first address to the terminal apparatus having transmitted the user identification information or transmits an email addressed to a user identified by the user identification information, the email transmitted by the first transmission unit including the first address, the first address being unique for each transmission, the first address corresponding to the received user identification information,
   wherein, when the receiver address is discriminated as the first address and the receiver address is determined not to be the same as the receiver address included in an email having been received before, the registration code is further configured to cause at least one of said at least one hardware processor to register the generation information in association with the user identification information corresponding to the receiver address included in the currently received email.

10. The information registration apparatus according to claim 1, wherein said program code further includes:
   user identification information reception code configured to cause at least one of said at least one hardware processor to transmit user identification information for identifying a user from a terminal apparatus;
   first transmission code configured to cause at least one of said at least one hardware processor to transmit the first address to the terminal apparatus having transmitted the user identification information or transmits an email addressed to a user identified by the user identification information, the transmitted email including the first address, in a body of the transmitted email, the first address being different from the a sender address of the transmitted email, the first address being unique for each transmission, the first address corresponding to the received user identification information, and
   third reception code configured to cause at least one of said at least one hardware processor to receive a third email including the first address as the third receiver address, addressed to the first address;
   wherein, when a third receiver address incorporated in the third received email is discriminated as the first address and the third receiver address is determined not to be the same as the receiver address included in the earlier received email, the registration unit registers the generation information in association with the user identification information corresponding to the third receiver address included in the third received email.

11. The information registration apparatus according to claim 10, wherein said program code further includes:
   request reception code configured to cause at least one of said at least one hardware processor to receive a request for the first address from a terminal apparatus;
   first address generation code configured to cause at least one of said at least one hardware processor to generate the first address every time the request is received;
   first control configured to cause at least one of said at least one hardware processor to store address information and discrimination information in association with each other into a storage, the address information indicating at least unique characters of characters included in the first address, the discrimination information indicating that the email address is the first address;
   second address generation code configured to cause at least one of said at least one hardware processor to generate the second address every time the generation information is registered and to generate the second address every time all the element information included in the received email is added; and
   second control code configured to cause at least one of said at least one hardware processor to store address information, discrimination information and generation information identification information in association with each other into the storage, the address information stored indicating at least unique characters of characters included in the second address, the discrimination information indicating that the email address is the second address, the generation information identification information identifying the generation information corresponding to the email address, the generation information identification information identifying either the generation information in case of the receiver address being discriminated as the first address or the generation information to which the element information is added in case of the receiver address being discriminated as the second address;
   wherein the first transmission code is further configured to cause at least one of said at least one hardware processor to transmit the first address or to transmit an email including the first address,
   the second transmission code is further configured to cause at least one of said at least one hardware processor to transmit the email including the second address,
   the discrimination code is further configured to cause at least one of said at least one hardware processor to discriminate the receiver address on the basis of the receiver address included in the received email, the address information stored in the storage and the discrimination information stored in the storage, and
   the addition code is further configured to cause at least one of said at least one hardware processor to add the element information included in the currently received email to the generation information identified by the generation information identification information corresponding to the address information of the receiver address included in the currently received email.

12. The information registration apparatus according to claim 1, wherein said program code further includes:

identification information generation code configured to cause at least one of said at least one hardware processor to generate address identification information identifying the second address when the receiver address is discriminated as the first address;

address generation code configured to cause at least one of said at least one hardware processor to generate unique information to be unique characters of characters included in the second address on the basis of the generated address identification information and generates the second address including the unique information; and storage code configured to cause at least one of said at least one hardware processor to store the generated address identification information, the unique information included in the generated second address, and the generation information identification information identifying the generation information corresponding to the second address in association with each other, wherein the discrimination code is further configured to cause at least one of said at least one hardware processor to discriminate that the receiver address is the second address when the unique information being the same as characters corresponding to the unique information in the receiver address is stored in a storage, the registration code is further configured to cause at least one of said at least one hardware processor to register the generation information including the element information included in the received email in association with the generation information identification information identifying the generation information, the second transmission code is further configured to cause at least one of said at least one hardware processor to transmit the email including the second address, and the addition code is further configured to cause at least one of said at least one hardware processor to add the element information to the generation information identified by the generation information identification information corresponding to the unique information included in the receiver address included in the received email.

13. The information registration apparatus according to claim 1, wherein
the reception code is further configured to cause at least one of said at least one hardware processor to receive an email to which an image is attached as the element information.

14. The information registration apparatus according to claim 1, wherein
the registration code is further configured to cause at least one of said at least one hardware processor to register the generation information to be used to generate a Web page that displays a recipe, the generation information including the element information included in the received email.

15. The information registration apparatus according to claim 14, wherein
the registration code is further configured to cause at least one of said at least one hardware processor to register the generation information including a subject and an image included in the received email as a title of the recipe and an image of a dish, and
the addition code is further configured to cause at least one of said at least one hardware processor to add an image included in the received email as an image showing a cooking process to the generation information.

16. The information registration apparatus according to claim 1, wherein
the reception code is further configured to cause at least one of said at least one hardware processor to receive an email transmitted from a mobile terminal apparatus.

17. The information registration apparatus according to claim 1, wherein said program code further includes:
display information generation code configured to cause at least one of said at least one hardware processor to generate display information showing the element information included in the registered generation information, the display information being used to display a Web page, the display information showing the element information as components of the Web page; and
display information transmission code configured to cause at least one of said at least one hardware processor to transmit the generated display information to a terminal apparatus.

18. An information registration method of an information registration apparatus, including at least one hardware processor, for registering, for each web page, generation information including element information to be components of a Web page on the basis of an email transmitted from a terminal apparatus, the information registration method comprising:
receiving, using at least one of said at least one hardware processor, an email, the email including the element information and a first address as a receiver address being an email address indicating a receiver, the first address being used for registering the generation information;
registering, using at least one of said at least one hardware processor, the generation information included in the currently received email;
transmitting, using at least one of said at least one hardware processor, every time the generation information is registered, an email addressed to a sender of the currently received email, the transmitted email including a second address, the second address corresponding to the registered generation information, the second address being unique for each transmission, the second address being used to add the element information to the generation information;
receiving, using at least one of said at least one hardware processor, an email including the element information and the second address as the receiver address, the second address being included in the earlier received email;
determining, using at least one of said at least one hardware processor, whether or not the receiver address included in the currently received email is the same as a receiver address included in the earlier received email; and
adding, using at least one of said at least one hardware processor, the element information included in the currently received email to the generation information corresponding to the receiver address included in the currently received email when the receiver address included in the currently received email is determined not to be the same as the receiver address included in the earlier received email,
wherein every time the element information included in the currently received email is added, the transmitting further comprises transmitting another email, which is addressed to the sender of the currently received email, including the new second address corresponding to the generation information to which the element information is added.

19. A non-transitory recording medium in which an information registration program is computer-readably recorded, the information registration program causing a computer, including at least one hardware processor, which is included in an information registration apparatus for registering, for each web page, generation information including element information to be a component of a Web page on the basis of an email transmitted from a terminal apparatus, to:

receive, using at least one of said at least one hardware processor, an email, the email including the element information and a first address as a receiver address being an email address indicating a receiver, the first address being used for registering the generation information;

register, using at least one of said at least one hardware processor, the generation information included in the currently received email;

transmit, using at least one of said at least one hardware processor, every time the generation information is registered, an email addressed to a sender of the currently received email, the transmitted email including a second address, the second address corresponding to the registered generation information, the second address being unique for each transmission, the second address being used to add the element information to the generation information;

receive, using at least one of said at least one hardware processor, an email including the element information and the second address as the receiver address, the second address being included in the earlier received email;

determine, using at least one of said at least one hardware processor, whether or not the receiver address included in the currently received email is the same as a receiver address included in an earlier received email; and add, using at least one of said at least one hardware processor, the element information included in the currently received email to the generation information corresponding to the receiver address included in the currently received email when the receiver address included in the currently received email is determined not to be the same as the receiver address included in the earlier received email, wherein every time the element information included in the currently received email is added, the information registration program further causes the computer to transmit another email, which is addressed to the sender of the currently received email, including the new second address corresponding to the generation information to which the element information is added.

\* \* \* \* \*